US012697265B2

(12) United States Patent
Clayton et al.

(10) Patent No.: US 12,697,265 B2
(45) Date of Patent: *Aug. 4, 2026

(54) SURGICAL TABLES

(71) Applicant: Steris Solutions Limited, Leicester (GB)

(72) Inventors: Matt Clayton, Lancing (GB); Mark Portlock, Lancing (GB)

(73) Assignee: STERIS Solutions Limited, Leicester (GB)

( * ) Notice: Subject to any disclaimer, the term of this patent is extended or adjusted under 35 U.S.C. 154(b) by 43 days.

This patent is subject to a terminal disclaimer.

(21) Appl. No.: 18/905,410

(22) Filed: Oct. 3, 2024

(65) Prior Publication Data

US 2025/0041140 A1 Feb. 6, 2025

Related U.S. Application Data

(63) Continuation of application No. 18/142,061, filed on May 2, 2023, now Pat. No. 12,121,477, which is a (Continued)

(30) Foreign Application Priority Data

Sep. 4, 2017 (GB) ..................................... 1714135

(51) Int. Cl.
*A61G 13/04* (2006.01)
*A47B 9/20* (2006.01)
(Continued)

(52) U.S. Cl.
CPC ................ *A61G 13/04* (2013.01); *A47B 9/20* (2013.01); *A61G 7/005* (2013.01); *A61G 7/008* (2013.01);
(Continued)

(58) Field of Classification Search
CPC ........ A61G 13/04; A61G 13/06; A61G 13/02; A61G 7/002; A61G 7/005; A61G 7/008;
(Continued)

(56) References Cited

U.S. PATENT DOCUMENTS 3,868,103 A 2/1975 Pageot
4,572,493 A 2/1986 Hubert
(Continued)

FOREIGN PATENT DOCUMENTS

CA 3074569 A1 3/2019
CA 3074571 A1 3/2019
(Continued)

OTHER PUBLICATIONS

Examination Report under Section 18(3) in related GB Application No. 1714135.9 issued on Aug. 6, 2019.
(Continued)

*Primary Examiner* — Robert G Santos

(57) ABSTRACT

A surgical table having a tabletop and a column for enabling at least a part of the tabletop to be rotatable about a trend axis extending in a transverse direction across the tabletop; and an actuator mechanism coupled between the movable framework and the column and arranged to raise and lower the movable framework and the trend axis relative to the column and to rotate the movable framework about the trend axis, wherein the actuator mechanism is fitted to an external surface of the outer column element and is adapted to move the movable framework between a lowermost position, at which the trend axis extends through an upper part of the outer column element which surrounds the inner column element when the column elements are telescoped into the contracted configuration, and an uppermost position, at which the trend axis is spaced at spacing height from an uppermost part of the column.

20 Claims, 24 Drawing Sheets

Related U.S. Application Data continuation of application No. 16/643,859, filed as application No. PCT/EP2018/073500 on Aug. 31, 2018, now Pat. No. 11,672,717.

(51) Int. Cl.

| | |
|---|---|
| *A61G 7/005* | (2006.01) |
| *A61G 7/008* | (2006.01) |
| *A61G 7/012* | (2006.01) |
| *A61G 13/06* | (2006.01) |
| *F16M 11/10* | (2006.01) |
| *F16M 11/28* | (2006.01) |

(52) U.S. Cl.
CPC ............. *A61G 7/012* (2013.01); *A61G 13/06* (2013.01); *A61G 2200/16* (2013.01); *F16M 11/10* (2013.01); *F16M 11/28* (2013.01)

(58) Field of Classification Search
CPC ...... A61G 7/012; A61G 2200/16; A47B 9/20; F16M 11/10; F16M 11/26; F16M 11/28
USPC .............................. 5/608, 607, 610, 611, 600
See application file for complete search history.

(56) References Cited

U.S. PATENT DOCUMENTS

| | | | |
|---|---|---|---|
| 4,958,817 A | 9/1990 | Heller | |
| 5,195,829 A | 3/1993 | Reser | |
| 5,398,356 A | 3/1995 | Pfleger | |
| 5,528,782 A | 6/1996 | Pfeuffer | |
| 5,621,933 A | 4/1997 | Knapp | |
| 5,655,238 A | 8/1997 | Stickley et al. | |
| 6,282,736 B1 | 9/2001 | Hand et al. | |
| 6,640,363 B1 | 11/2003 | Pattee | |
| 11,389,359 B2 | 7/2022 | Clayton | |
| 11,400,005 B2 | 8/2022 | Clayton | |
| 11,406,551 B2 | 8/2022 | Clayton | |
| 11,446,195 B2 | 9/2022 | Clayton | |
| 11,452,656 B2 | 9/2022 | Campbell | |
| 11,602,475 B2 | 3/2023 | Clayton | |
| 11,672,717 B2 | 6/2023 | Clayton | |
| 12,121,477 B2 * | 10/2024 | Clayton | A61G 13/04 |
| 12,127,982 B2 * | 10/2024 | Clayton | A61G 7/012 |
| 2005/0015878 A1 | 1/2005 | Bannister | |
| 2013/0111666 A1 | 5/2013 | Jackson | |
| 2015/0135438 A1 | 5/2015 | Marugg | |
| 2017/0000676 A1 | 1/2017 | Revenus | |
| 2020/0188207 A1 | 6/2020 | Clayton | |
| 2020/0197249 A1 | 6/2020 | Clayton | |
| 2020/0345571 A1 | 11/2020 | Clayton | |
| 2020/0383857 A1 | 12/2020 | Clayton | |
| 2021/0000670 A1 | 1/2021 | Clayton | |
| 2021/0000671 A1 | 1/2021 | Clayton | |
| 2021/0186789 A1 | 6/2021 | Campbell | |
| 2023/0190561 A1 | 6/2023 | Clayton | |
| 2023/0263684 A1 | 8/2023 | Clayton | |
| 2023/0363968 A1 | 11/2023 | Koerth | |
| 2025/0041140 A1 * | 2/2025 | Clayton | A47B 9/20 |
| 2025/0381085 A1 * | 12/2025 | Ansley | A61G 7/018 |

FOREIGN PATENT DOCUMENTS

| | | | | |
|---|---|---|---|---|
| CA | 3074572 A1 | 3/2019 | | |
| CA | 3074574 A1 | 3/2019 | | |
| CA | 3074575 A1 | 3/2019 | | |
| EP | 4241753 B1 * | 1/2025 | ............. | A61G 13/06 |
| EP | 3678624 B1 * | 10/2025 | ............. | H02G 11/00 |
| GB | 2566080 A | 3/2019 | | |
| GB | 2566081 A | 3/2019 | | |
| GB | 2566082 A | 3/2019 | | |
| GB | 2567657 A | 4/2019 | | |
| GB | 2566076 B | 10/2019 | | |
| GB | 2566082 B | 10/2019 | | |
| GB | 2566157 B | 10/2019 | | |
| GB | 2566160 B | 10/2019 | | |
| GB | 2567657 B | 10/2019 | | |
| GB | 2566078 B | 7/2020 | | |
| GB | 2566079 B | 7/2020 | | |
| GB | 2566129 B | 7/2020 | | |
| GB | 2566158 B | 7/2020 | | |
| GB | 2566159 B | 7/2020 | | |
| WO | 2003030802 A2 | 4/2003 | | |
| WO | 2019043150 A1 | 3/2019 | | |
| WO | 2019043152 A1 | 3/2019 | | |
| WO | 2019043153 A2 | 3/2019 | | |
| WO | 2019043155 A1 | 3/2019 | | |
| WO | 2019043165 A2 | 3/2019 | | |
| WO | 2019043173 A2 | 3/2019 | | |
| WO | 2019076526 A1 | 4/2019 | | |
| WO | WO-2025264454 A1 * | 12/2025 | ............. | A61G 13/04 |

OTHER PUBLICATIONS

Combined Search and Examination Report Under Sections 17 and 18(3) in related GB Application No. 1714135.9 issued on Mar. 6, 2018.

Invitation to Pay Additional Fees and Partial Search Report in related PCT Application No. PCT/EP2018/073500 issued on Jan. 11, 2019.

International Search Report and Written Opinion in related PCT Application No. PCT/EP2018/073500 issued on Mar. 11, 2019.

International Preliminary Report on Patentability issued in corresponding international application PCT/EP2018/073500 on Mar. 10, 2020.

* cited by examiner

Figure 7a          88    82    78        50        118      78                90
83
126          92
94                    81    54        56
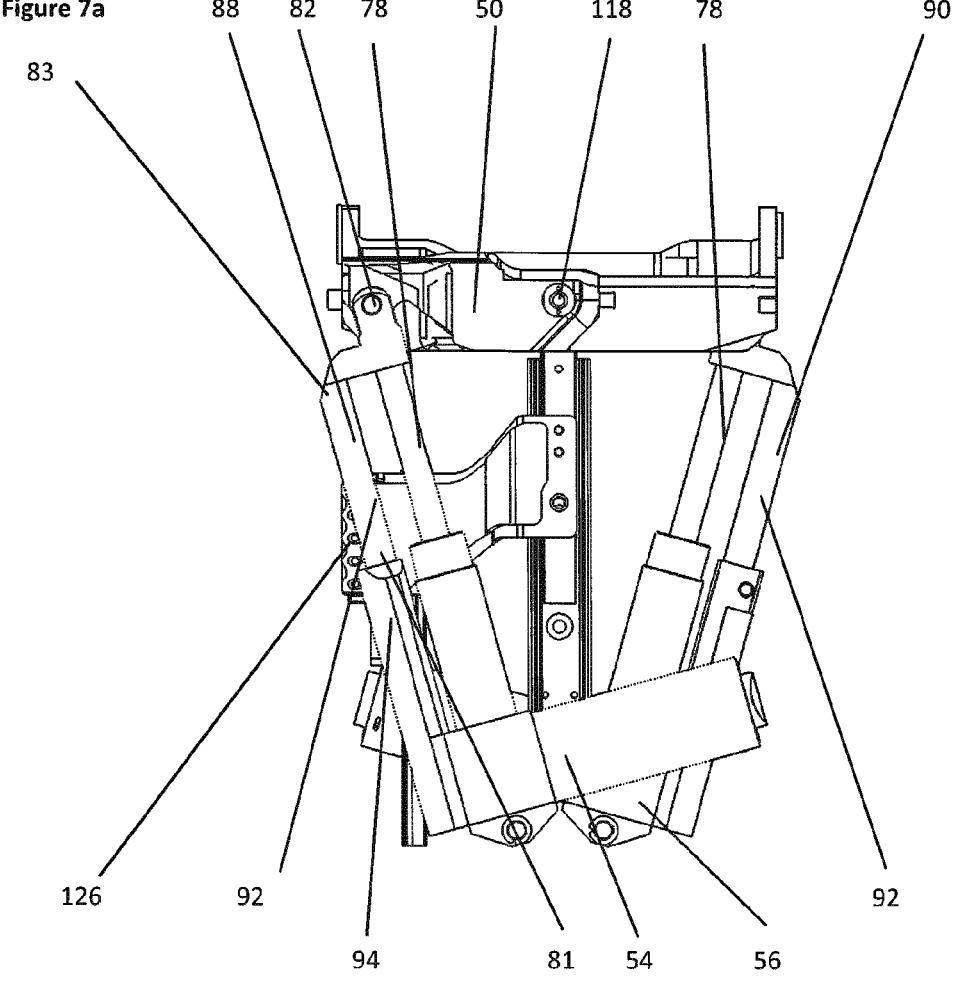

Figure 20b    458    454    456    453    452
412    414
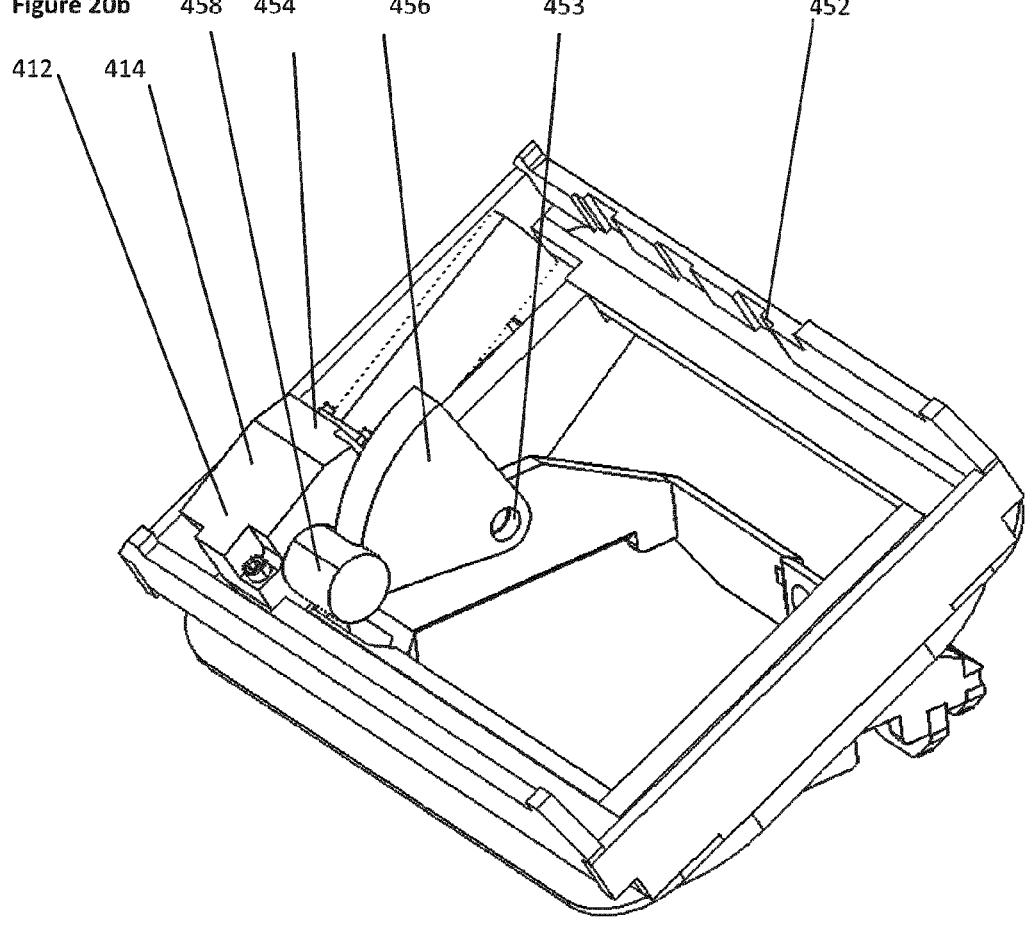

Figure 21     506   504     508     510     502
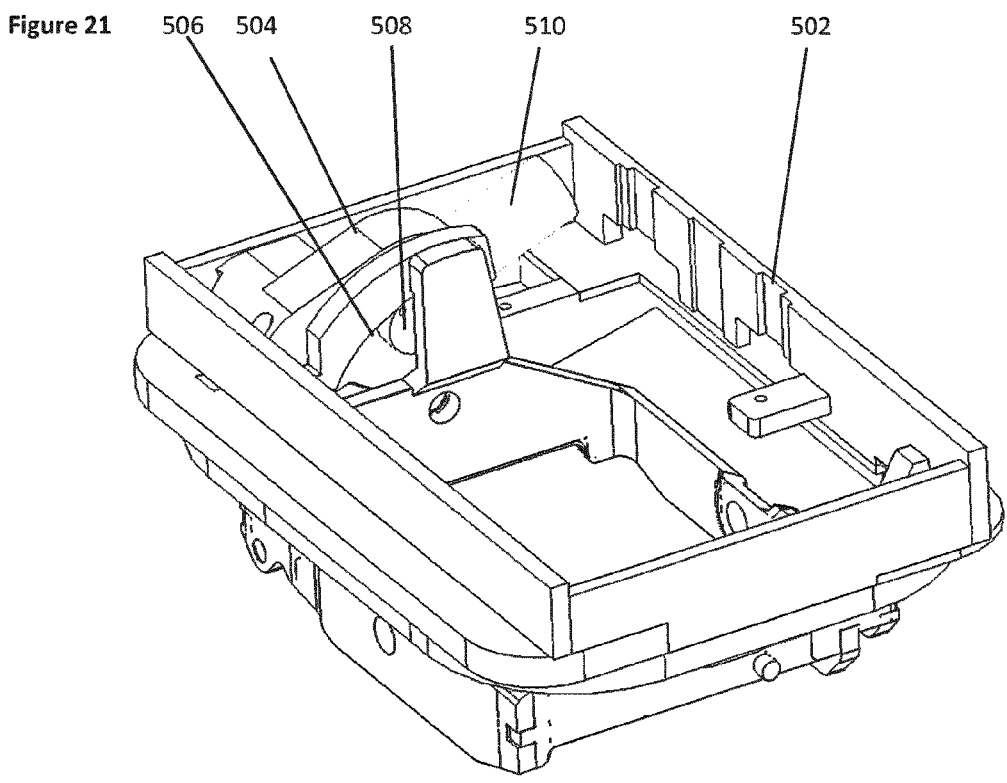
Figure 22
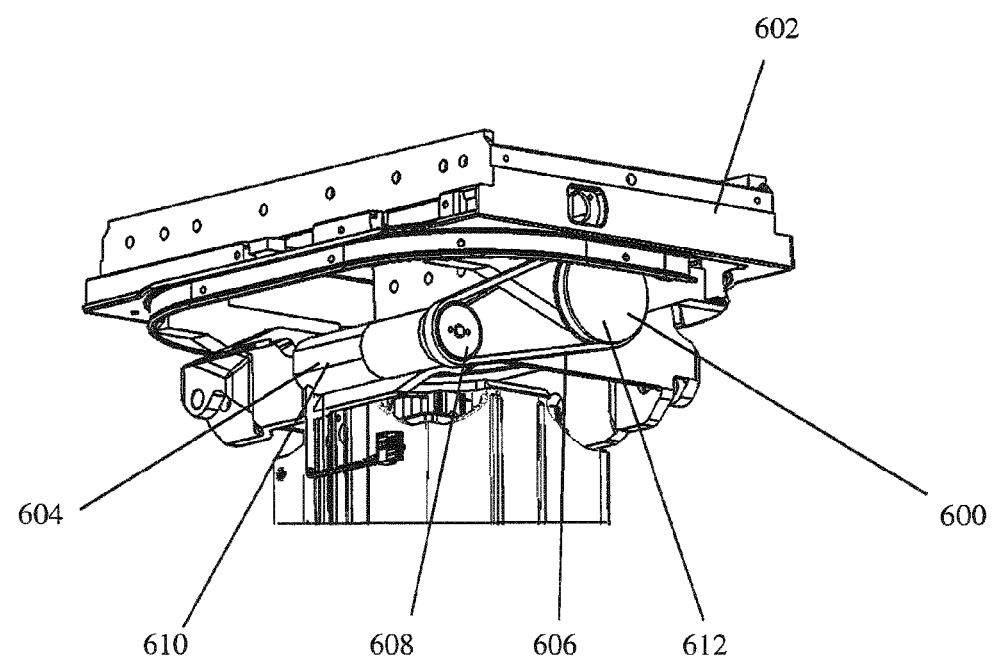
602
604
600
610     608     606     612

Figure 23    50    700    706    710    704    716    702    714    712    717    708
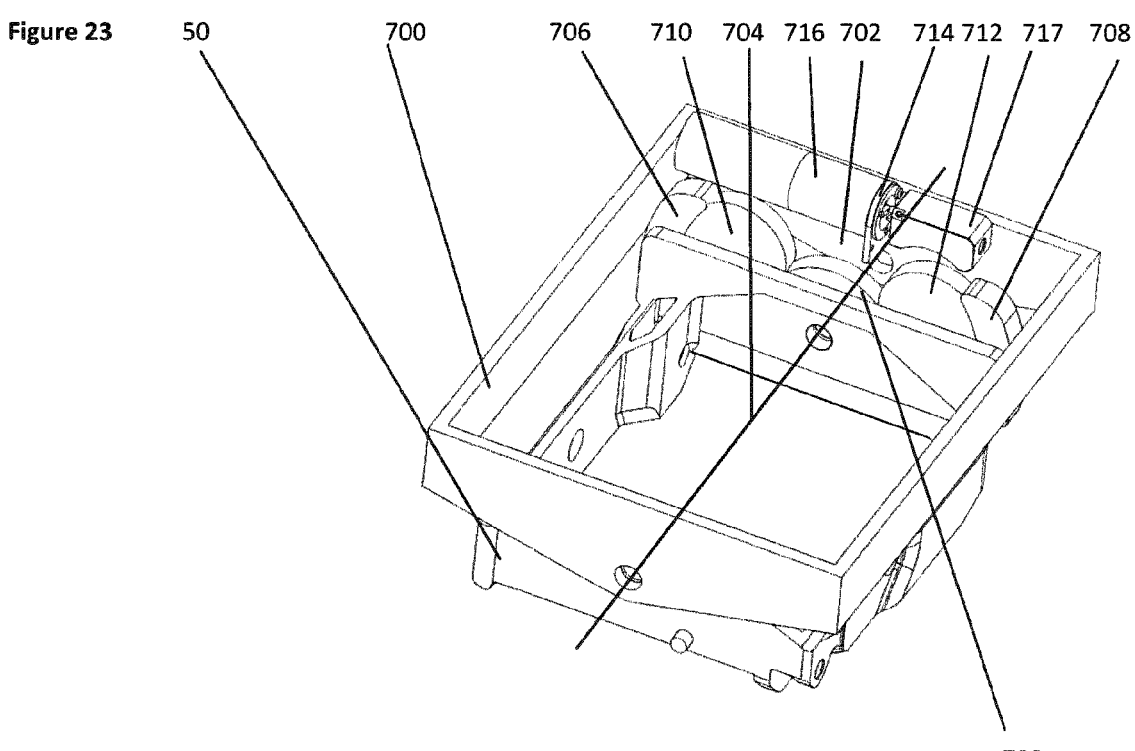
722
Figure 24    708    720    712    722    710    718    706    700    50
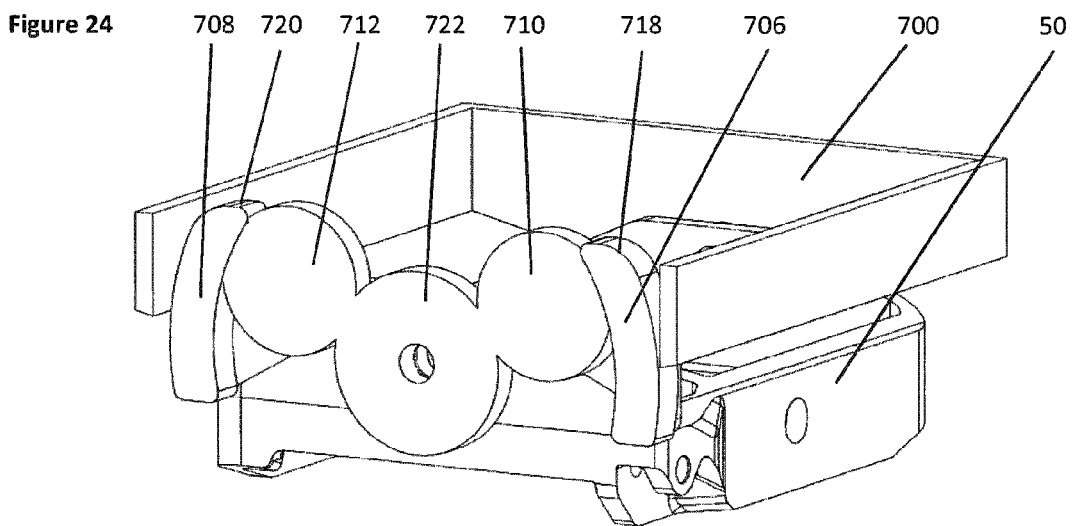

708          720     712          722          710  718          706          50    700

SURGICAL TABLES

FIELD OF THE INVENTION

The present invention relates to surgical tables.

BACKGROUND

Surgical tables, or operating tables, comprising a base for standing on a floor, a column extending from the base, and a tabletop providing a patient support surface are well known. There is a general need in the art for surgical tables to have variable height to enable the tabletop to be located at a selected height which is most suitable for the required surgical, therapeutic or diagnostic treatment of a patient positioned on the surgical table. The column is extendable, typically by a telescoping arrangement, to allow the column to be moved between contracted and extended positions in order to lower and/or raise the tabletop to a desired height.

SUMMARY OF THE INVENTION

There is a particular need in the art for the column to have a wide range of lengths to enable the tabletop to be located at any position within a wide range of heights. The column has a most contracted configuration and a most extended configuration, and the distance separating those configurations constitutes the operating range of the column. The column is adapted to be movable to any position within that operating range.

It is particularly desired for the column to be structured so that when the column is in the most contracted configuration, at which the tabletop is at the lowest position of the height range, the height of the tabletop above the floor on which the surgical table is standing is as low as possible. A low operating height for the surgical table can provide easier loading and unloading of the patient onto and from the surgical table. Also, a low operating height for the surgical table can more easily permit laproscopic surgery and improves the ergonomics of the table for the surgeon.

However, it is also particularly desired for the column to be structured so that when the column is in the most extended configuration, at which the tabletop is at the highest position of the height range, the height of the tabletop above the floor on which the surgical table is standing is as high as possible. A high operating height for the surgical table may be required for some operating procedures, for example orthopaedic surgery.

Therefore there is a need for a wide operating range for the tabletop height and also the ability to provide as low a height as possible for the lowest position of the tabletop within that operating range.

Still further, the tabletop of the surgical table is generally required to be movable relative to the column so as to be tiltable about two orthogonal horizontal axes, namely a tilt axis extending longitudinally along the length of the tabletop and a trend axis extending transversely across the length of the tabletop.

The structure of the tabletop and the column, and of the actuator mechanisms to move the tabletop relative to the column about the tilt axis and/or the trend axis, must enable free movement about the tilt axis and/or the trend axis over a wide range of tilt/trend angles, and over a wide range of table operating heights.

Therefore there is a need for a wide operating range for the tabletop height and also the ability to provide as low a height as possible for the lowest position of the tabletop within that operating range while still permitting wide tilt/trend functionality.

In addition, there is a generally need for the column and the associated actuator mechanisms which raise and lower the tabletop to have a small cross-sectional area, with small length (in the table length direction) and width (in the table width direction), so that the "footprint" of the column in minimised. This in turn can permit the dimensions of the base to be minimised, which assists access to the patient by medical personnel.

Finally, the weight of patients is generally increasing as a result of increasing obesity in some countries. The column must be capable of bearing a vertical load of, for example, more than 500 kg and must be capable of bearing a correspondingly high offset load, when the tabletop is tilted about the trend or tilt axis.

Current commercial surgical operating tables have a typical minimum operating height of 580 to 600 mm or higher. In this specification the "minimum operating height" of an operating table means the minimum height of all parts of the entire tabletop surface, including the part of the tabletop that is located directly above the column, relative to the floor when the operating table is free-standing on the floor. The measurement is made without any mattresses which are conventionally removably placed onto the tabletop. The operating table may have a base which is movable, for example incorporating castors, or fixed, for example having fixed feet.

The requirement that the height must be measured for all parts of the entire tabletop surface means, for example, that the minimum height cannot be measured simply by measuring the height of a head portion of the tabletop when the head portion is lowered into a trend configuration, and so the head portion is a lowermost part of the tabletop and the centre and leg parts of the tabletop are significantly higher, with the leg portion being higher than the part of the tabletop that is located directly above the column.

There is a need in the art to provide a surgical table which has a lower minimum operating height, but which can also have a wide range of height adjustment, high trend and reverse trend angles and a small column footprint.

There is a need for a surgical table with a more compact mechanism for disposing a tabletop in a wide range of different configurations.

The present invention provides a surgical table.

Optional and/or preferred features are defined in the various embodiments.

BRIEF DESCRIPTION OF THE DRAWINGS

Preferred embodiments of the present invention will now be described by way of example only with reference to the accompanying drawings, in which:

FIG. 3 is a schematic side view of the column and the mechanism for controlling the trend angle and height of the trend frame of the surgical table of FIG. 1, showing the column at minimum height and the trend frame at minimum height;

FIG. 4 is a schematic side view of the column and the mechanism for controlling the trend angle and height of the trend frame of the surgical table of FIG. 1, showing the column at minimum height and the trend frame at maximum height;

FIGS. 17a and 17b schematically illustrate the cable configuration in the cable management system of FIG. 15 when the column is in the contracted or extended configuration respectively;

FIGS. 20a and 20b illustrate a tilt frame of the tilt mechanism of FIG. 19 rotated about the tilt axis at two opposite end positions relative to a central level position;

FIG. 21 is a schematic perspective view of a tilt mechanism of a surgical table in accordance with a further embodiment of the present invention;

FIG. 22 is a schematic perspective view of a tilt mechanism of a surgical table in accordance with a further embodiment of the present invention;

FIG. 23 is a schematic perspective view from one end view of a tilt mechanism of a surgical table in accordance with a further embodiment of the present invention with the tilt frame in a level configuration;

FIG. 24 is a schematic perspective view from the opposite end of the a tilt mechanism of FIG. 23 with the tilt frame in a level configuration.

DETAILED DESCRIPTION

Referring to FIGS. 1 to 17b, a surgical table, designated generally as 2, comprises a base 4 or standing on a floor. The base 4 typically includes wheels for moving the table 2 along the floor. Alternatively, the base 4 may be fixed, for example having fixed feet. A column 6 of adjustable height is mounted on and extends from the base 4. A tabletop 8, which provides a patient support surface 10, is supported above the column 6.

As described hereinafter, the surgical table 2 includes a mechanism for inclining the tabletop 8 relative to the column 6 by inclining the tabletop 8 about transverse and longitudinal horizontal axes of the tabletop 8. Inclination about the transverse horizontal axis of the tabletop 8 is referred to in the art as "trending", while inclination about the longitudinal horizontal axis of the tabletop 8 is referred to as "tilting". Compound movements also are possible, in which the tabletop 8 is inclined about both the transverse and longitudinal axes of the tabletop 8 at the same time.

As used herein, the longitudinal axis of the tabletop 8 is the major axis of the tabletop 8 and the transverse axis of the tabletop 8 is the orthogonal minor axis of the tabletop 8. The longitudinal direction of the tabletop 8 is parallel to the major axis and the transverse direction of the tabletop 8 is parallel to the minor axis. That is, the transverse direction of the tabletop 8 is perpendicular to, or orthogonal to, the longitudinal direction of tabletop 8.

Figure 1:
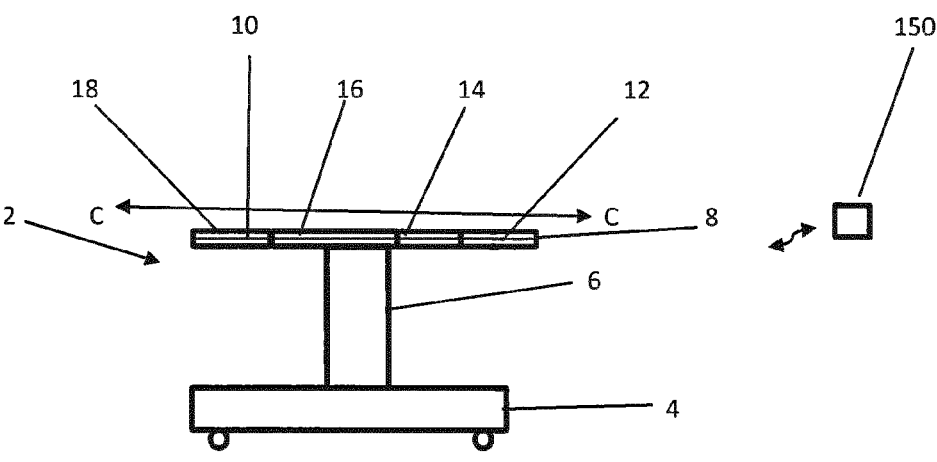
FIG. 1 is a schematic side view of a surgical table in accordance with an embodiment of the present invention.

As depicted in FIG. 1, the tabletop 8 is typically divided into five sections, namely a head section 12, an upper torso section 14, a lower torso section 16 and a pair of laterally adjacent leg sections 18, of which only one is shown in FIG. 1. The lower torso section 16 is coupled to the column 8. Each of the sections of the tabletop 8 provides a portion of the patient support surface 10, and each of the sections has a respective separate mattress (not illustrated) removably fitted to the respective section. As is well known in the art, the tabletop sections can be individually moved relative to an adjacent section and some sections can be detached from the tabletop 8.

Figure 6:
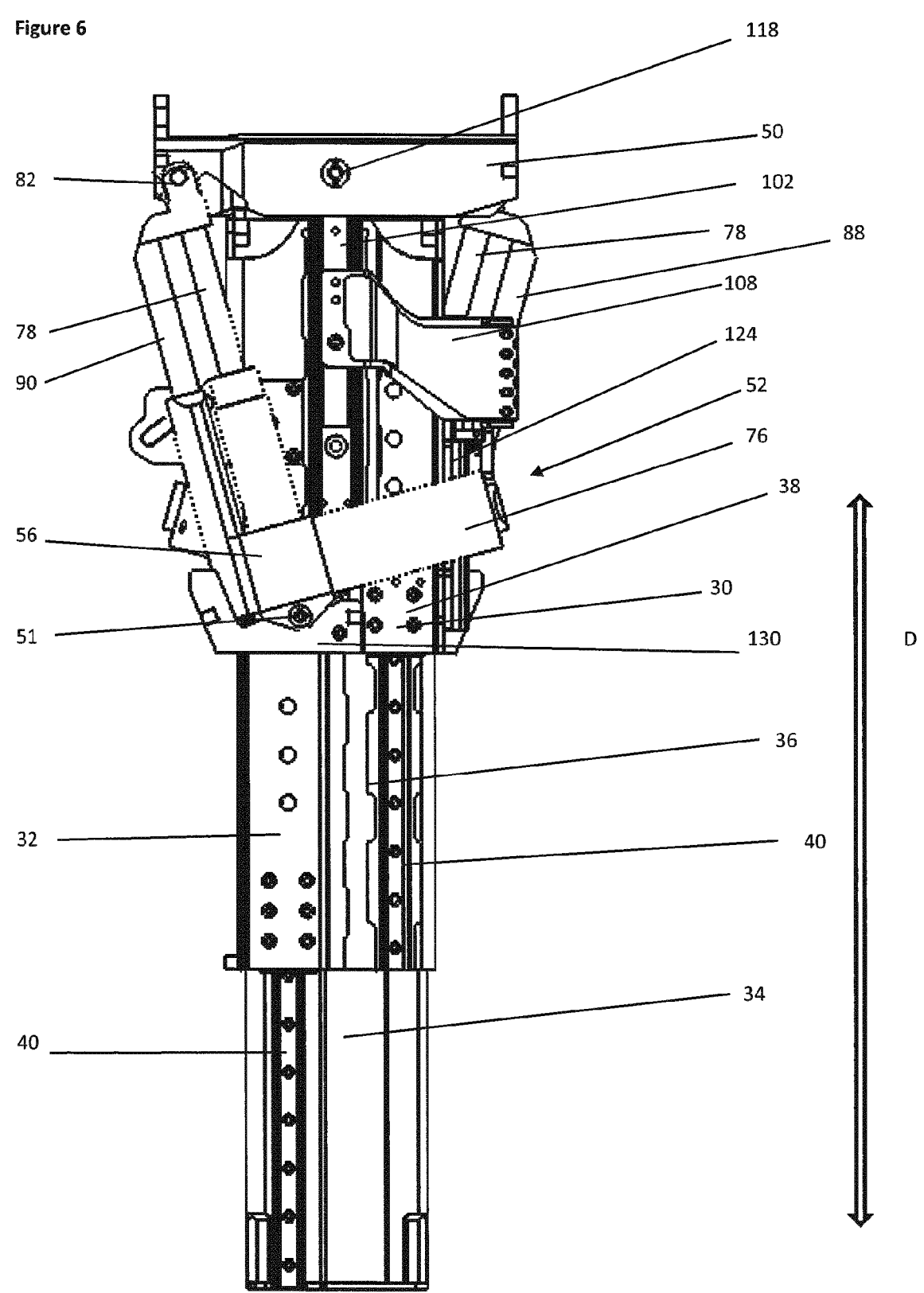
FIG. 6 is a schematic side view of the column and the mechanism for controlling the trend angle and height of the trend frame of the surgical table of FIG. 1, showing the column at FIGS. 7a, 7b and 7c are schematic side views of the column and the mechanism for controlling the trend angle and height of the trend frame of the surgical table of FIG. 1, showing the trend axis at an intermediate height and the trend frame respectively in a horizontal configuration, in a reverse trend configuration and in a trend configuration.
Figure 12:
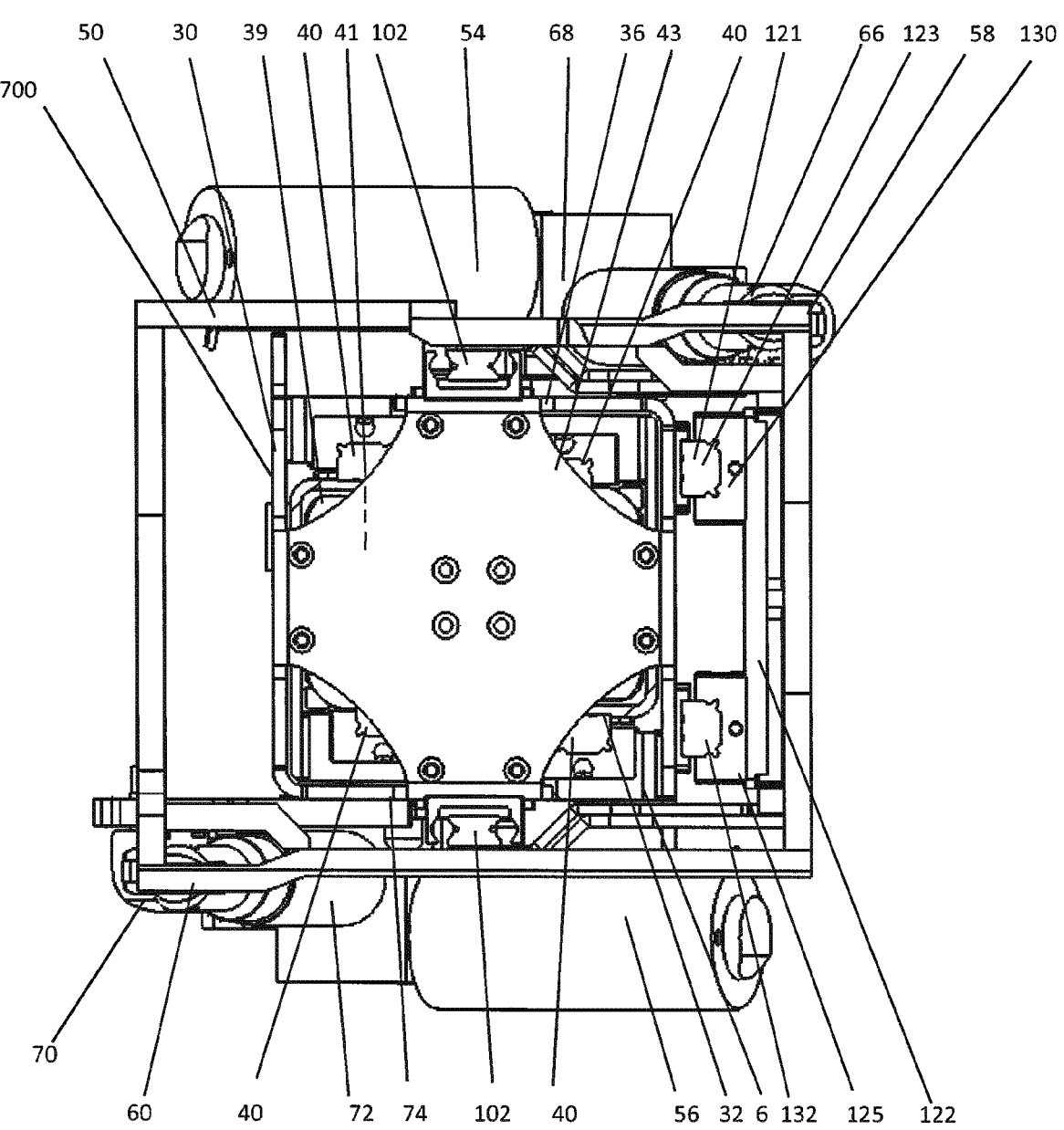
FIG. 12 is a schematic plan view of the column and the mechanism for controlling the trend angle and height of the trend frame of the surgical table of FIG. 1.
Figure 13:
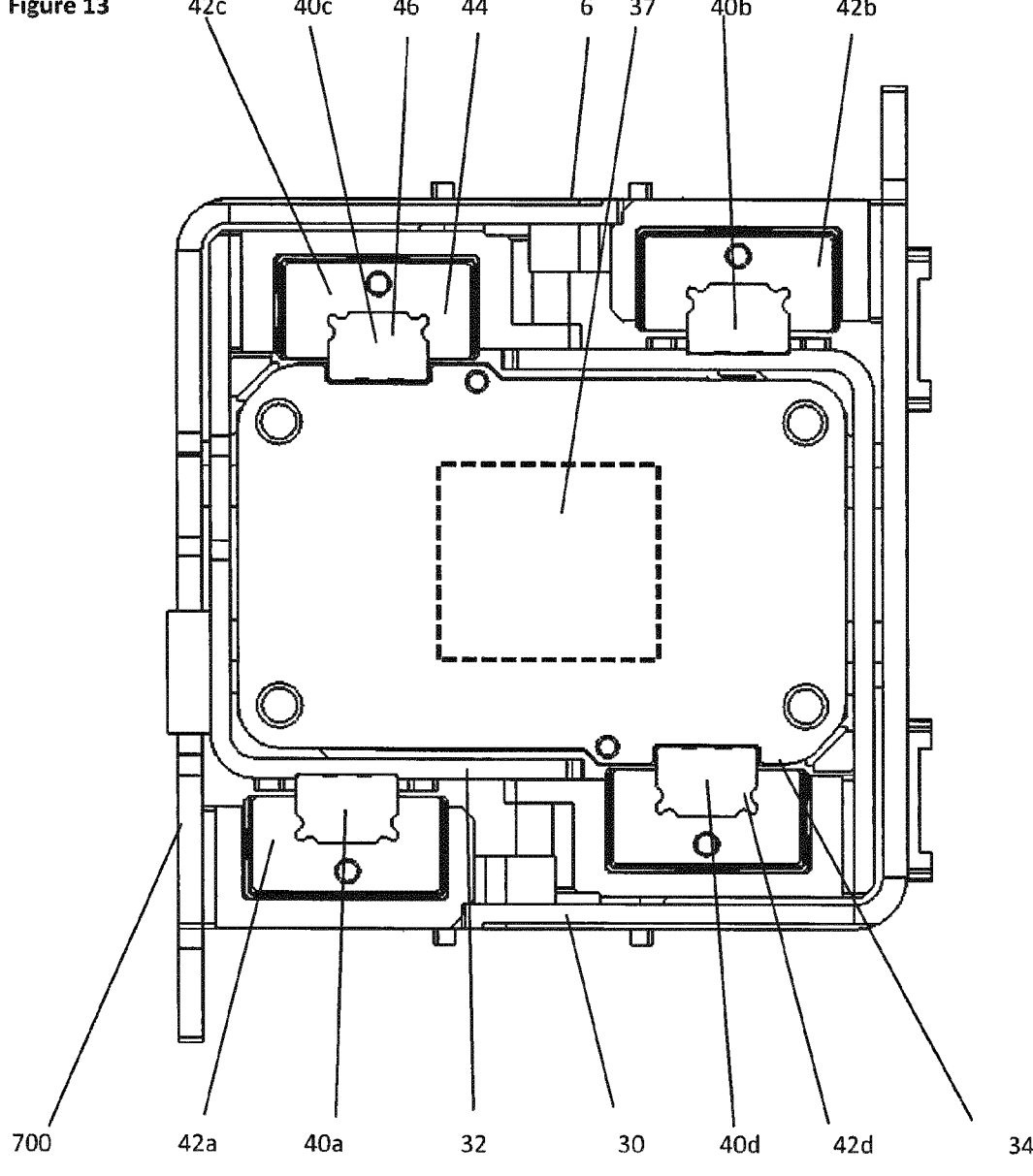
FIG. 13 is a schematic bottom view from below of the column of the surgical table of FIG. 1.

Referring in particular to FIGS. 6, 12 and 13, the column 6 comprises a plurality of column elements 30, 32, 34 which form a telescoping assembly 36. The telescoping assembly 36 surrounds an actuator 37, which is shown schematically and in phantom in FIG. 13, for raising and lowering the column 6. The actuator 37 comprises a column drive mechanism located within the inner column element 34 of the plurality of column elements 30, 32, 34. The plurality of column elements comprises an outer column element 30 and an inner column element 34. The outer column element 30 externally surrounds the inner column element 34 and defines an external surface 38 of the column 6 when the column elements 30, 32, 34 are telescoped into a contracted configuration. The plurality of column elements further comprises at least one intermediate column element 32 between the outer column element 30 and the inner column element 34. In the illustrated embodiment there is only one intermediate column element 32, although a telescoping series of plural intermediate column elements 32 may be provided.

The actuator 37 typically comprises an electric actuator 37. The actuator 37 is coupled between the outer column element 30 and the base 4 and drives the outer column element 30 upwardly and downwardly relative to the base 4, with the plurality of column elements 30, 32, 34 being coupled together so as to be raised or lowered in synchronism. The actuator 37 has an upper end 39 coupled to a drive surface 41 affixed to the outer column element 30 of the plurality of column elements, and the drive surface 41 is a provided by a plate 43 located inwardly of, and affixed to, the outer column element 30.

The actuator 37 may comprise a two-stage synchronised telescopic leadscrew, or ballscrew/leadscrew combination. The lifting load is directed entirely through the leadscrew ballscrew/leadscrew combination and there are no axial bearings required to support the lifting load. Alternatively, the actuator 37 may comprise two ballscrews, or a leadscrew/ballscrew combination. In this specification a ballscrew comprises a type of leadscrew and so when a reference is made herein to a leadscrew that term may also be construed to encompass a ballscrew.

Position sensors and high/low limit switches may be provided on the column 6. End stops may be provided to limit the high/low positions of the plurality of column elements.

The column 6 comprises a plurality of linear motion guide units 40 between each pair of adjacent column elements 30, 32, 34. The linear motion guide units 40 are recirculating ball-type linear guides. The linear motion guide units 40 extend in a telescoping direction D and are mutually spaced. There is a pair of linear motion guide units 40 between each pair of adjacent column elements 30, 32, 34. The linear motion guide units 40 of each pair are located on opposite sides of the trend axis T-T and on opposite sides of a tilt axis X-X orthogonal to the trend axis T-T.

The column 6 has a substantially rectangular cross-section, which in the illustrated embodiment is a square cross-section, for example having dimensions of 180 mm×180 mm. Each pair of linear motion guide units 40 are located at opposite corners 42 of the rectangular cross-section.

The column elements 30, 32, 34 are thin-walled tubular sections. The linear motion guide units 40 located at opposite corners 42a, 42b, 42c, 42d of the rectangular cross-section maximise the torsional rigidity of the column structure and equalise the offset load capability in both the cranial and caudal directions. The maximum footprint of the column 6 is typically 180 mm×180 mm.

As shown in the illustrated embodiment, the column 6 has one intermediate column element 32 between the outer column element 30 and the inner column element 34. A first pair of linear motion guide units 40a, 40b between the outer column element 30 and the intermediate column element 32 are located at first opposite corners 42a, 42b of the rectangular cross-section and a second pair of linear motion guide units 40c, 40d between the inner column element 34 and the intermediate column element 32 are located at second opposite corners 42c, 42d of the rectangular cross-section.

Each linear motion guide unit 40 comprises an elongate channel 44 fixed to one column element of the pair of adjacent column elements and an elongate bar 46 fixed to the other column element of the pair of adjacent column elements, the elongate bar 46 being slidable in the elongate channel 44. Bearings, not shown, are provided between the elongate bar 46 and the elongate channel 44 to provide a low friction slider arrangement. Preferably, the elongate channel 44 is fixed to an outer column element of the pair of adjacent column elements and the elongate bar 46 is fixed to the inner column element of the pair of adjacent column elements.

As shown particularly in FIGS. 2a to 13, the surgical table 2 incorporates a mechanism for controlling the trend angle and height of a trend frame 50, which is beneath the tabletop 8. The trend frame 50 can be rotated about a trend axis, and the angle of inclination of the trend frame 50 sets the trend angle of the tabletop 8.

Referring in particular to FIGS. 2a to 8c, a movable framework 50, constituting a trend frame 50, is mounted between the tabletop 8 and the column 6. The movable framework 50 enables at least a part of the tabletop 8, for example the lower torso section 16, to be rotatable about the trend axis T-T. The trend axis T-T extends through the movable framework 50 in a transverse direction across the tabletop 8. The tilt axis X-X extends through the movable framework 50 and is orthogonal to the trend axis T-T. The tilt axis X-X is parallel to a central longitudinal axis C-C of the tabletop 8.

Figures 2A, 2B:
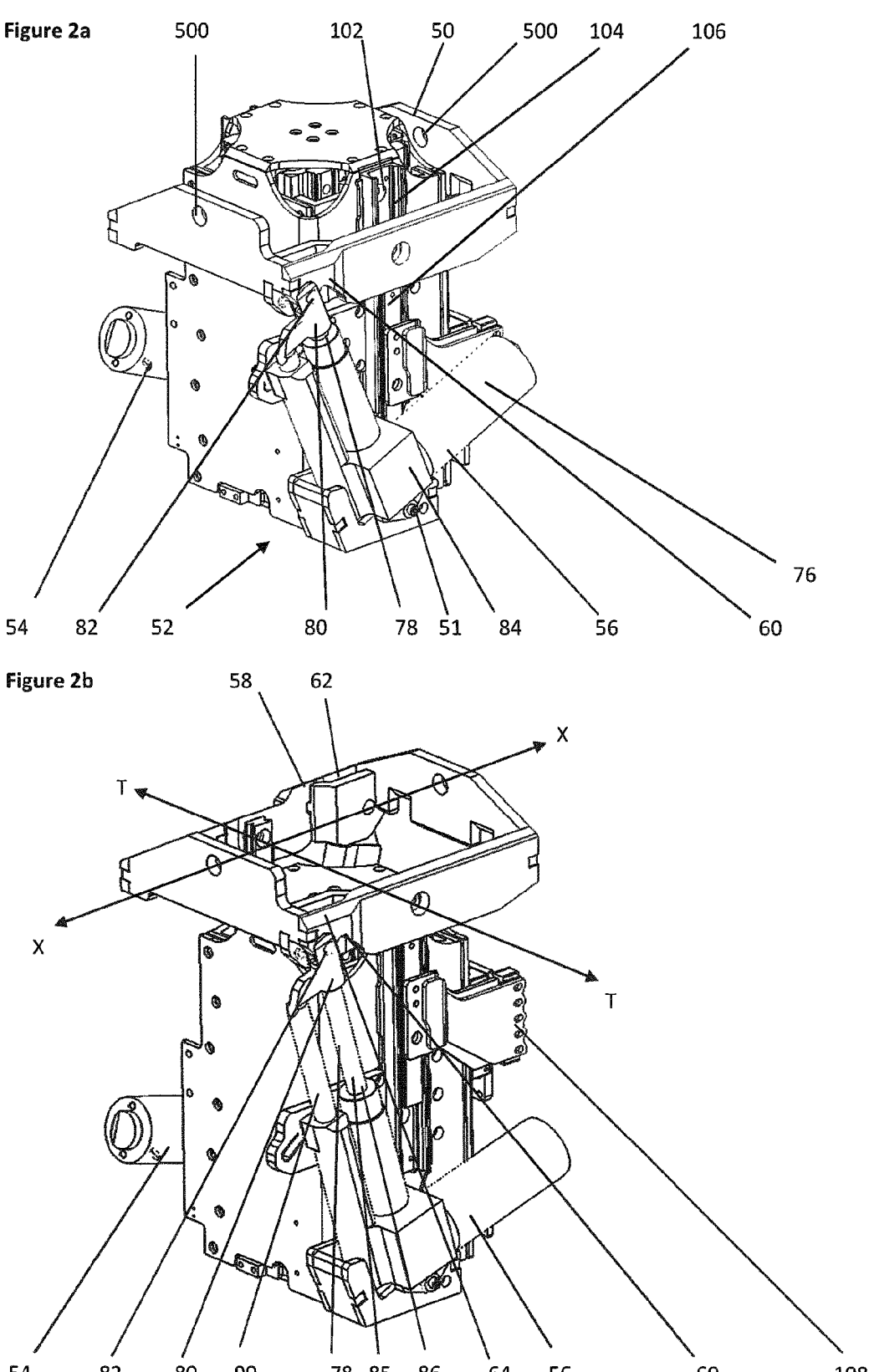
FIGS. 2a and 2b are each is a schematic perspective side view from above of the column and a mechanism for controlling the trend angle and height of a trend frame of the surgical table of FIG. 1, respectively showing the column at minimum height and the trend frame at minimum height and the column at minimum height and the trend frame at maximum height.

The trend frame 50, provided by the movable framework 50, is adapted to move about the trend axis T-T, and a tilt frame (not shown) is mounted above the movable framework 50 at the pivot points 500 shown in FIG. 2a to enable the tilt frame to move independently by a separate drive system (not shown) about the tilt axis X-X. Various drive systems for such a tilt frame are known to those skilled in the art. The lower surface of the tabletop 8 is directly fitted to the tilt frame. The tilt frame is located above the trend axis T-T.

Accordingly, movement of the movable framework 50 about the trend axis T-T, or when the trend axis T-T is translated upwardly or downwardly, causes corresponding movement of the tabletop 8 which is fitted to the tilt frame carried by the trend frame 50, provided by the movable framework 50, and the tilt frame can further impart additional tilting motion and positioning to the tabletop 8.

A first actuator mechanism 52 is coupled to the movable framework 50 and arranged to raise and lower the movable framework 50 relative to the column 6 and to rotate the movable framework 50 about the trend axis T-T. The first actuator mechanism 52 is external of the column 6.

The first actuator mechanism 52 comprises first and second actuators 54, 56. The first actuator 54 is connected to a first portion 58, preferably located at one end, of the movable framework 50 and the second actuator 56 is connected to a second portion 60, preferably located at an opposite end, of the movable framework 50. The first and second portions 58, 60 are mutually spaced and located on opposite sides of the trend axis T-T and on opposite sides of the tilt axis X-X. The movable framework 50 is substantially rectangular and the first and second portions 58, 60 are located at diagonally opposite corners 62, 64 of the movable framework 50. The movable framework 50 has a rigid frame having opposite first and second end portions 58, 60 mutually spaced a fixed distance.

In the embodiment, the first and second actuators 54, 56 are the only actuators coupled between the column 6 and the movable framework 50 for causing movement of the movable framework 50 relative to the column 6.

The first actuator 54 has an upper first end 66 connected to the first portion 58 of the movable framework 50. The first actuator 54 has a lower second end 68 coupled to the column 6. The second actuator 56 has an upper first end 70 connected to the second portion 60 of the movable framework 50 and a lower second end 72 coupled to the column 6. The second end 68, 72 of each of the first and second actuators 54, 56 is coupled to an external surface 74 of the column 6.

The first and second actuators 54, 56 each comprise an electric motor 76, which comprises an elongate element 78 having an upper end 80 connected by a pivot joint 82 to the movable framework 50 and a drive assembly 84 for extending, or retracting, the elongate element 78 so as respectively to raise, or lower, the respective first and second portions 58, 60 of the movable framework 50.

In the illustrated embodiment, the elongate element 78 comprises a leadscrew 86 and the drive assembly 84 is adapted to rotate the leadscrew 86 to extend, or retract, the leadscrew 86 so as respectively to raise, or lower, the respective first and second portions 58, 60 of the movable framework 50.

In an alternative embodiment, the elongate element 78 may comprise a hydraulically operated piston. Any other type of actuator may be used that is suitable to raise, or lower, the respective first and second portions 58, 60 of the movable framework 50. The present invention is not limited to any particular drive mechanism for the first and second actuators 54, 56.

First and second stabilisers 88, 90 are also provided. Each first and second stabiliser 88, 90 is associated with a respective one of the first and second actuators 54, 56. However, in a modified embodiment only one of the actuators is provided with a stabiliser.

The stabiliser 88, 90 comprises an extendable assembly which is fitted between the movable framework 50 and a lower mount pivotally coupled to the column 6, typically the lower mount being pivotally coupled to the drive assembly 84. An upper end of the extendable assembly is fitted to an upper end of the elongate element 78 of the respective actuator 54, 56. In the illustrated embodiment, the extendable assembly and the elongate element 78 of the respective actuator 54, 56 are in parallel, but in alternative embodiments a non-parallel arrangement may be provided.

In the illustrated embodiment, each stabiliser 88, 90 comprises a rigid elongate guide rod 92, which is parallel to the elongate element 78 of the respective first or second actuator 54, 56. The guide rod 92 is fitted at its upper end 83 to the respective pivot joint 82.

A hollow guide 94 slidably receives the lower portion 81 of the guide rod 92 and is pivotally coupled to the column 6. The guide rod 92 is slidable within the hollow guide 94 when the respective elongate element 78 is extended or retracted. The guide rod 92 and hollow guide 94 form the extendable assembly. The fitting between the upper end 83 of the guide rod 92 and the respective pivot joint 82 is translationally fixed, and so the guide rod 92 and its associated elongate element 78 commonly move translationally when the elongate element 78 is extended or retracted by operation of the respective electric motor 76.

The first and second stabilisers 88, 90 function to minimise the lateral loading acting on the first and second actuators 54, 56, in particular the elongate elements 78. The first and second stabilisers 88, 90 each ensure that the actuator loading is essentially in-line with the axis of the respective elongate element 78. Accordingly, buckling loads on the elongate element 78 are minimised, particularly when the elongate element 78 is in a highly extended position which is required for certain configurations of the movable framework 50, i.e. the trend frame 50, as discussed below.

Figure 10:
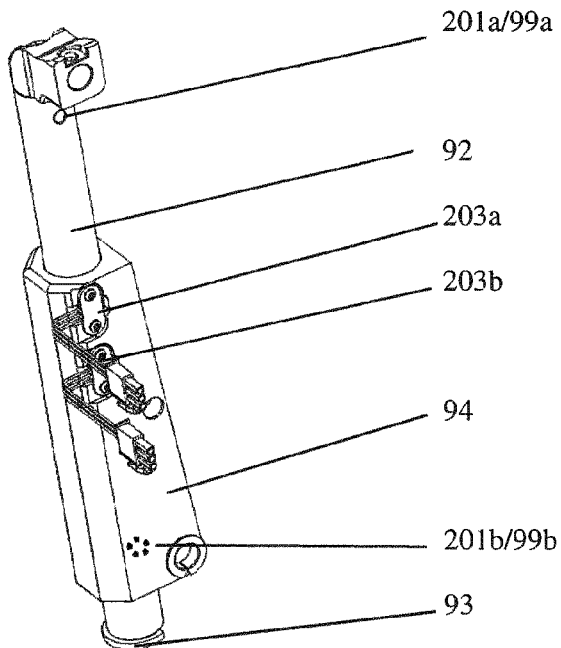
FIG. 10 is a schematic perspective side view of an embodiment of a stabiliser for the mechanism for controlling the trend angle and height of the trend frame of the surgical table of FIG. 1.
Figure 11:
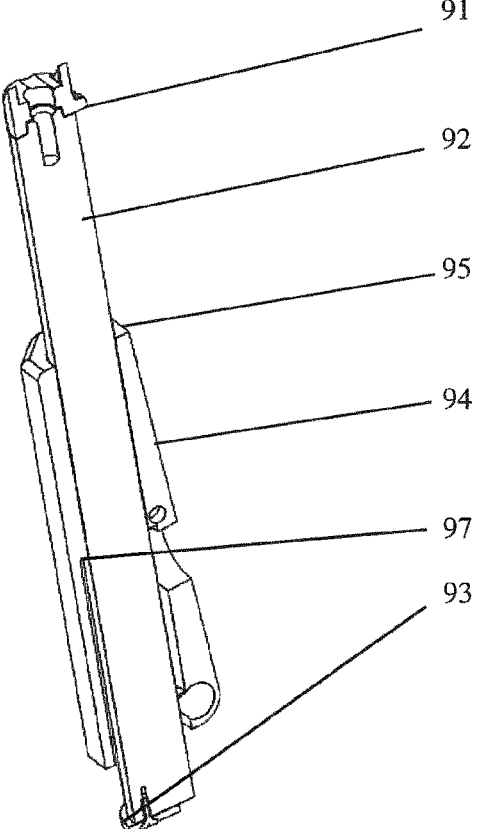
FIG. 11 is a schematic cross-section through the stabiliser of FIG. 10.

The first and second stabilisers 88, 90 also function to provide a hard end stop for the respective elongate elements 78 when the elongate element 78 is in the most extended or most retracted configuration. As shown in the structure of the stabilisers 88, 90, which is shown in FIGS. 10 and 11, this is provided by stop members 91, 93 that are fitted to the guide rod 92 and are respectively urged against a respective movement limiter 95, 97 of the hollow guide 94 to define a maximum upward or downward position for the guide rod 92 relative to the hollow guide 94 and thereby limit the maximum upward extension or downward retraction of the elongate element 78. Stop member 91 and movement limiter 95 define a minimum-dimension contracted position for the first and second stabilisers 88, 90 and stop member 93 and movement limiter 97 define a maximum-dimension extended position for the first and second stabilisers 88, 90.

One or more position sensors are located on each of the first and second stabilisers 88, 90 to enable the translational position of the guide rod 92, and thereby the associated elongate element 78, to be detected. In the illustrated embodiment, a contracted position sensor 99a comprises a magnet 201a on an upper end of the elongate element 78 and a magnetic sensor 203a on the hollow guide 94 and an extended position sensor 99b comprises a magnet 201b (shown in phantom) on a lower end of the elongate element 78 and a magnetic sensor 203b on the hollow guide 94. The position sensors 99a, 99b can permit the position of the elongate element 78 relative to an upper or lower limit to be detected.

The provision of a hard end stop and position sensors 99a, 99b on the first and second stabilisers 88, 90 rather than directly on the associated elongate element 78, i.e. helical screw, of the first and second actuators 54, 56 provides the advantages as compared to known designs where such functions are provided directly on the helical screw. Locating a hard end stop or position sensor on a helical screw is difficult to implement because the screw runs through the gearbox of the drive assembly 84 and ends stops on a helical screw may interfere with the maximum stroke or maximum or minimum height achievable by the elongate element 78.

By locating the hard end stop and position sensors 99a, 99b on the first and second stabilisers 88, rather than on the elongate element 78, the required functions to detect and limit the position of the elongate element 78 are achieved indirectly by detecting and controlling the associated guide rod 92 without compromising the stroke range and freedom of motion of the elongate element 78.

The drive assembly 84 of each first and second actuator 54, 56 is pivotally connected to the movable framework 50 by a pivot mount 51. Therefore each of the first and second actuators 54, 56, including a respective electric motor 76, elongate element 78, and drive assembly 84, and a respective one of the first and second stabilisers 88, 90, is rotatable about the respective pivot mount 51.

The first and second actuators 54, 56 can be operated independently so as to be driven in the same or opposite directions. Therefore the rotational orientation of the first and second actuators 54, 56 about the respective pivot mount 51 can be different.

The first and second actuators 54, 56, and correspondingly the respectively associated first and second stabiliser 88, 90, are not oriented in a geometrically vertical orientation, i.e. aligned with the direction of orientation of the column 6, but instead are inclined to the vertical, i.e. aligned to the direction of orientation of the column 6.

The elongate element 78 is linear and is inclined at an acute angle from a plane including a longitudinal axis of the column 6 and the trend axis T-T so that the upper end 80 is oriented further from the plane than a lower portion 85 of the elongate element 78. The elongate elements 78 of the first and second actuators 54, 56 are oriented in opposite directions from the plane. The acute angle of inclination of each elongate element 78 from the plane decreases as the extension of the elongate element 78 increases.

The angles of the first and second actuators 54, 56 to the vertical when extended or retracted depends on various parameters, including the length of the actuator when extended or retracted, the horizontal distance separating the lower pivots of the first and second actuator 54, 56 (which is typically from 60 to 100 mm) and the length of the movable framework 50 between the upper pivots of the first and second actuator 54, 56. In one embodiment, when the first or second actuator 54, 56 is configured so that the respective leadscrew 86 is fully retracted, so as to lower the respective first or second portion 58, 60 of the movable framework 50, the first or second actuator 54, 56 is in a first pivot position in which the leadscrew 86 is oriented at a relatively large acute angle (for example 10 to 25°) relative to the vertical, i.e. the direction of orientation of the column 6, the angle also being dependent upon the height of the other actuator.

Correspondingly, in that embodiment, when the first or second actuator 54, 56 is configured so that the respective leadscrew 86 is fully extended, so as to raise the respective first or second portion 58, 60 of the movable framework 50, the first or second actuator 54, 56 is in a second pivot position in which the leadscrew 86 is extended and at a relatively small acute angle (for example 6 to 16°) relative to the vertical, i.e. the direction of orientation of the column 6, the angle also being dependent upon the height of the other actuator.

When the first and second actuators 54, 56 are both fully retracted in that embodiment, each leadscrew 86 is oriented at an acute angle of from 18 to 25° relative to the vertical. When the first and second actuators 54, 56 are both fully extended in that embodiment, each leadscrew 86 is oriented at an acute angle of from 12 to 17° relative to the vertical. When one of the first and second actuators 54, 56 is fully extended and the other of the first and second actuators 54, 56 is fully retracted, the extended leadscrew 86 is oriented at an acute angle of from 5 to 8° relative to the vertical and the retracted leadscrew 86 is oriented at an acute angle of from 9 to 13° relative to the vertical.

The movable framework 50 defines an internal opening 98 which is larger than an upper end 100 of the column 6. The first actuator mechanism 52 is capable of lowering the movable framework 50 relative to the column 6 to a lowermost position in which the movable framework 50 is below the upper end 100 of the column 6 and annularly surrounds the column 6. In the lowermost position the trend axis T-T is below the upper end 100 of the column 6, and extends through an upper part of the outer column element 30 which surrounds the inner column element 34 when the column elements 30, 32, 34 are telescoped into the contracted configuration, and typically the movable framework 50 is entirely below the upper end 100 of the column 6.

The first actuator mechanism 52 is capable of raising the movable framework 50 relative to the column 6 to an uppermost position in which the movable framework 50 is above the upper end 100 of the column 6. In the uppermost position the trend axis T-T is above the upper end 100 of the column 6, and is spaced by a spacing height from an uppermost part of the column 6, and typically the movable framework 50 is above, preferably entirely above, the upper end 100 of the column 6. The first actuator mechanism 52 is fitted to the outer column element 30 and when the column elements 30, 32, 34 are telescoped into an extended configuration the first actuator mechanism 52, the movable framework 50 and the tabletop 8 are raised relative to the base 4.

In the illustrated embodiment two linear guide mechanisms 102 are provided on opposite sides of the column 6. Each linear guide mechanism 102 extends along at least a part of the column 6. Each linear guide mechanism 102 comprises a first part 104 coupled to the column 6 and a second part 106 coupled to the movable framework 50. Each linear guide mechanism 102 comprises a respective pair of first and second parts 104, 106.

Figure 5:
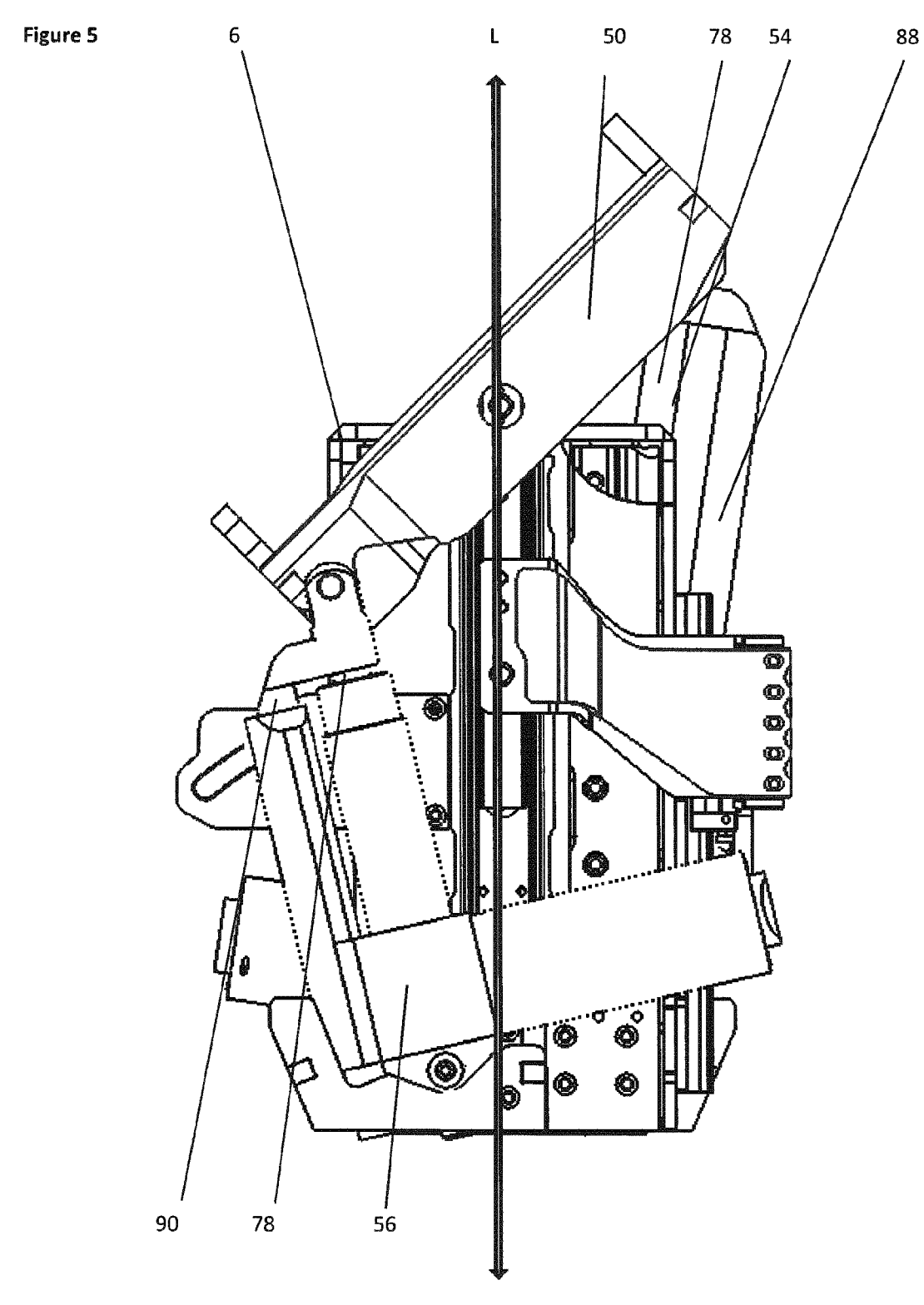
FIG. 5 is a schematic side view of the column and the mechanism for controlling the trend angle and height of the trend frame of the surgical table of FIG. 1, showing the column at minimum height and the trend frame at an intermediate height, and with the trend frame at a reverse trend angle of 45°.

The first and second parts 104, 106 are relatively movable along a linear axis L-L, shown in FIG. 5, of the linear guide mechanism 102 to enable the movable framework 50 to be translated along the linear axis L-L by relative movement of the first and second parts 104, 106. The first part 104 is a fixed linear guide member 110, fixed to the column 6, and the second part 106 is a movable linear guide member 112, coupled to the movable framework 50 at a trend pivot 118. The first part 104 is an elongate channel 114 and the second part 106 is an elongate slider 116 within the channel 114, although the opposite configuration may be employed.

In the illustrated embodiment, the two linear guide mechanisms 102 are raised or lowered synchronously with the raising or lowering of the trend pivots 118. The two linear guide mechanisms 102 ensure that the trend pivots 118 can only move vertically.

Optionally, the linear guide mechanisms 102 may be provided with a locking mechanism to lock the linear guide mechanism 102 at a selected height, and thereby lock the trend pivots 118, and the trend axis T-T, at a selected height.

Additionally or alternatively, the linear guide mechanisms 102 may be provided with a braking mechanism which can be activated to brake the movement of the linear guide mechanisms 102. Both the locking mechanism and the braking mechanism act to take at least a proportion of the applied tabletop load from the first and second actuators 54, 56.

The locking and/or braking mechanism may be an electric actuator, a hydraulic cylinder or a locking gas spring, all of which constructions are known to those skilled in the art.

Figures 3, 4:
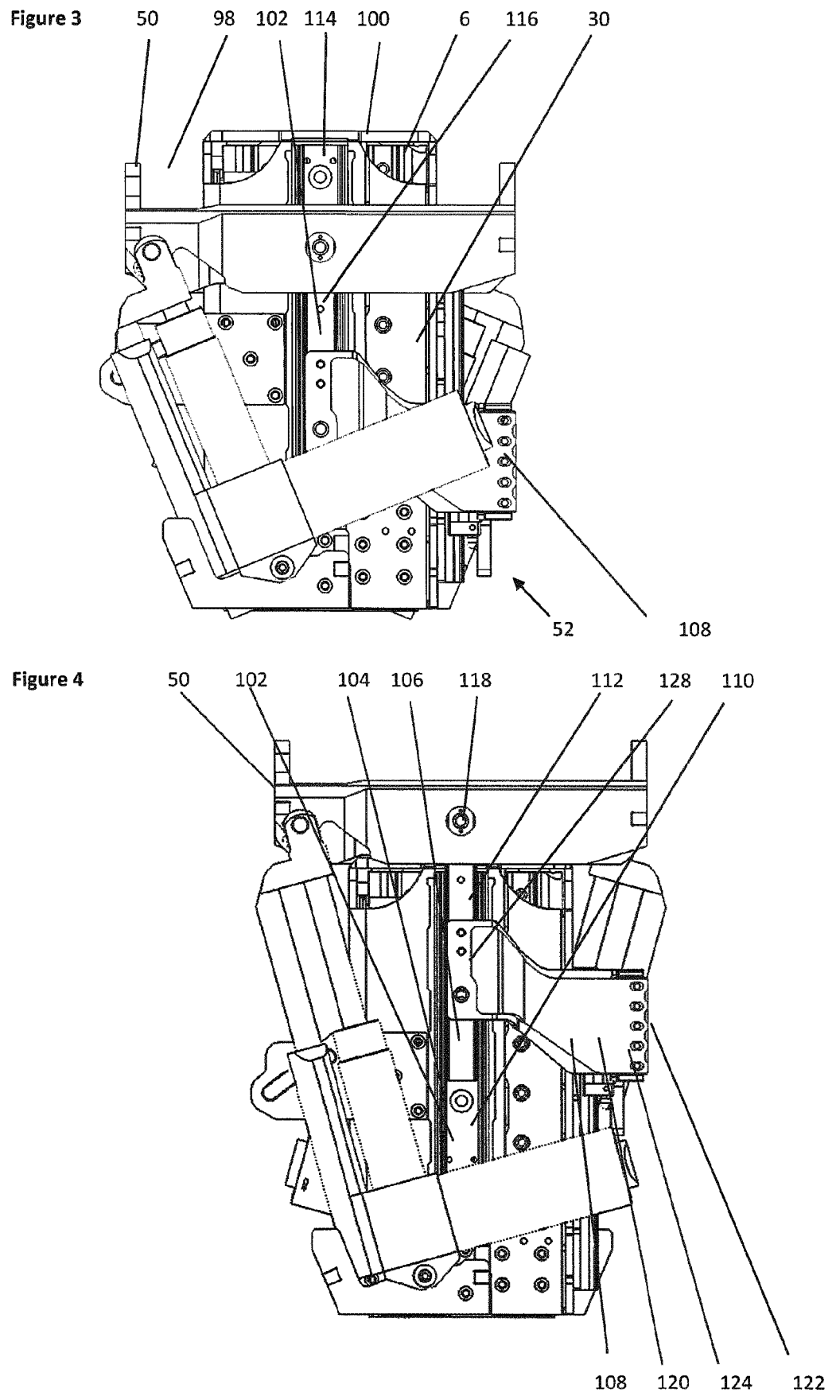
Figure 14A:
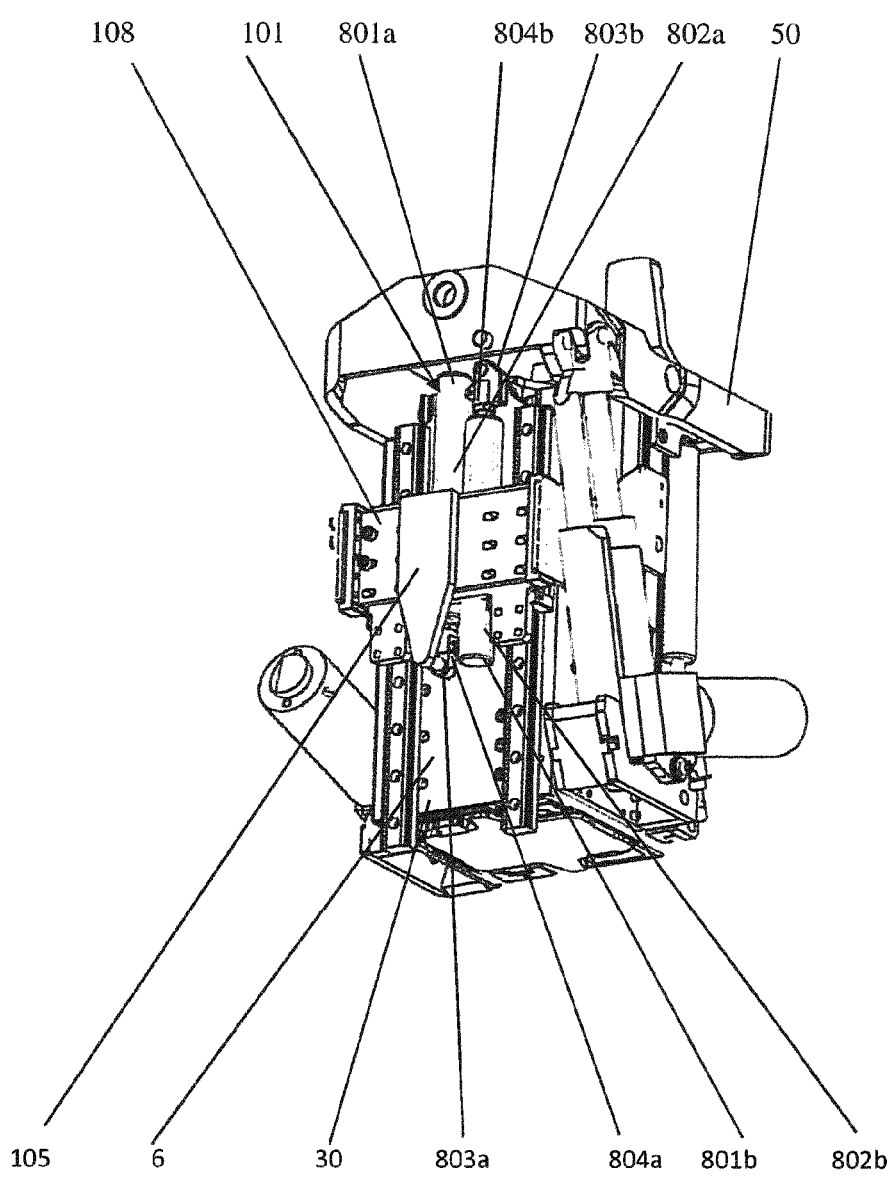
FIGS. 14a and 14b are each a schematic perspective view of a locking and/or braking mechanism of the surgical table of FIG. 1 at respective different heights of the movable framework relative to the column.
Figure 14B:
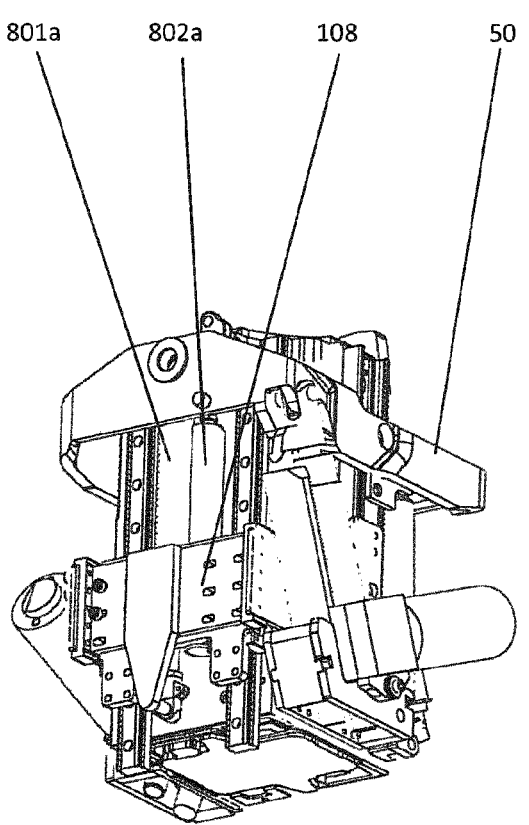

Referring additionally to FIGS. 4, 14*a*, and 14*b*, a brace mechanism 108 is coupled to, and mounted between, the pair of linear guide mechanisms 102. The brace mechanism prevents twisting of the trend pivot 118 and the associated linear guide mechanisms 102. The brace mechanism 108 comprises a brace element 120 having a central plate member 122 and two opposite end plate members 124, 126 that are orthogonal to the central plate member 122 and oriented in a common direction. A free end 128 of each end plate member 124, 126 is rigidly affixed, for example by bolts or screws, to a respective movable linear guide member 112, and thereby coupled to the movable framework 50.

The brace mechanism 108 functions to connect together the pair of linear guide mechanisms 102 for the trend pivot so that the movable framework 50 does not twist when under a high applied mechanical load, for example particularly when a heavy patient is on the tabletop 8. The brace mechanism 108 ensures that the two opposite linear guide mechanisms 102 are located at the identical height.

A twisting force applied to the movable framework 50, i.e. the trend frame 50, at least partly about an axis extending orthogonal to the trend axis T-T, acting for example to urge one lateral side of the movable framework 50 downwardly relative to the opposite lateral side of the movable framework 50, is resisted by the brace mechanism 108. The plate members 122, 124, 126 are typically composed of heavy gauge steel so as to exhibit high rigidity and resistance to shear forces in the plane of the respective plates.

In a preferred modification to increase the rigidity of the brace mechanism 108, as shown in FIG. 12 the central plate member 122 is movably fitted to the column 6 by one or more linear brace guides 121 which extend along the column 6. Each linear brace guide 121 has a fixed linear brace guide member 123, fixed to the column 6, and a movable linear brace guide member 125, coupled to the movable framework 50. The movable linear brace guide member 125 is an elongate channel 130 and the fixed linear brace guide member 123 is an elongate slider 132 within the channel 130, although the opposite configuration may be employed.

The first actuator mechanism 52 is fitted to an external surface 136 of the outer column element 30. The linear guide mechanisms 102, and when present the one or more linear brace guides 124, are also fitted to the outer column element 30, in particular to the external surface 136 of the outer column element 30. When the column elements 30, 32, 34 are telescoped into an extended configuration, the linear guide mechanisms 102 and the brace mechanism 108 are raised relative to the base 4.

The movable framework 50, and consequently the tabletop 8 thereon, is supported on the column 6 (i) by the first and second actuators 54, 56 and the respective associated stabilisers 88, 90 and (ii) by the linear guide mechanisms 102 and the associated brace mechanism 108. In order to provide enhanced resistance of the surgical table 2 to twisting forces which may be encountered in use, rather than over-strengthening the actuators 54, 56, stabilisers 88, 90, linear guide mechanisms 102 and/or brace mechanism 108, which would enlarge the weight and dimensions of the column and would reduce the ability of the column to be contracted to a low height, and increase component costs, the surgical table 2 is preferably provided with a further twist-resisting mechanism. The twist-resisting mechanism may comprise a connection between at least one of the actuator/stabiliser assemblies and the column 6 at a location between the upper and lower ends of the actuator/stabiliser assembly so that twisting of the actuator/stabiliser assembly relative to the column 6 is prevented or at least minimised. One embodiment of a twist-resisting mechanism is shown in FIGS. 1 to 6 and 9.

Figure 9:
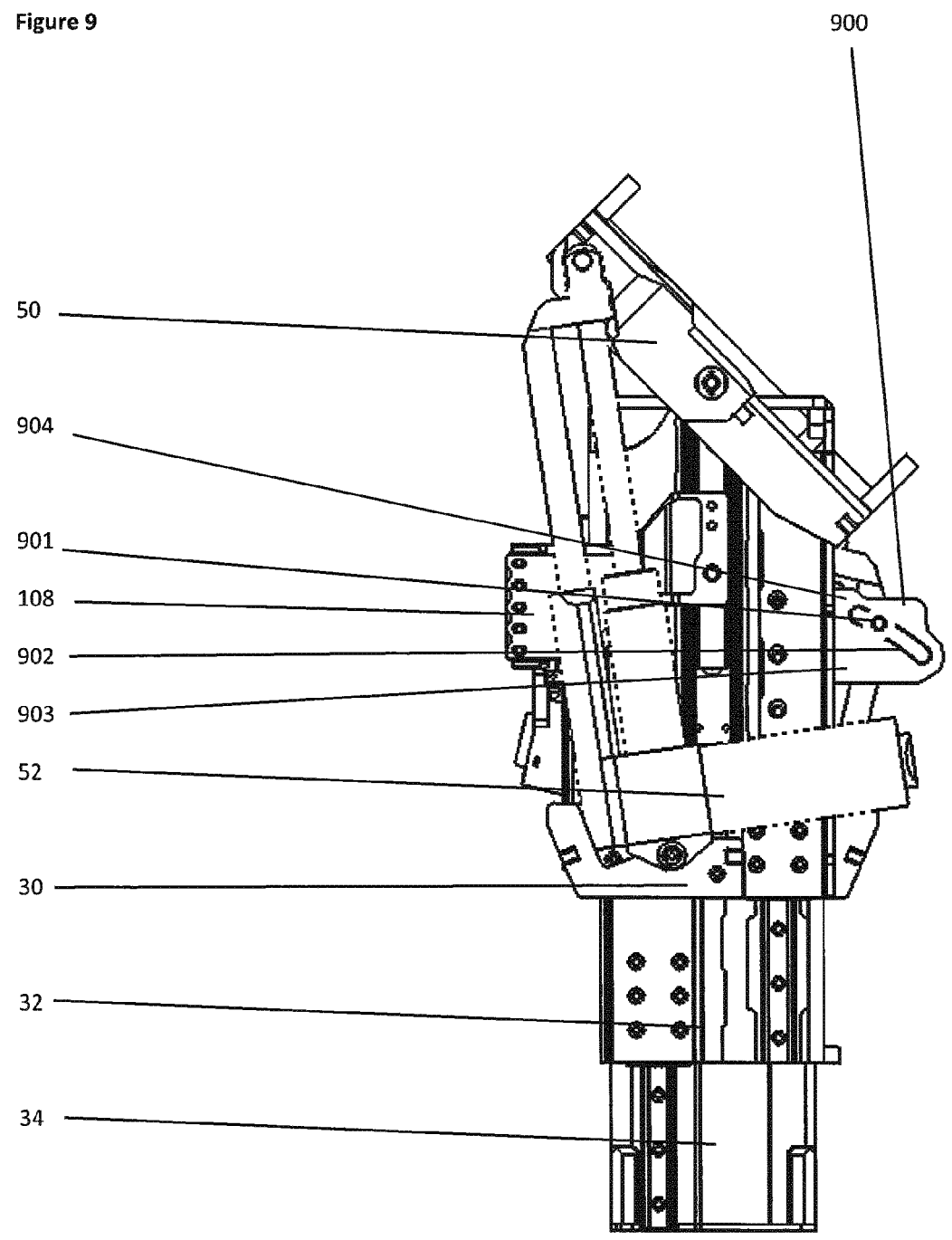
FIG. 9 is a schematic side view of the column and the mechanism for controlling the trend angle and height of the trend frame of the surgical table of FIG. 1, showing the column at an intermediate height and the trend frame in a reverse trend configuration.

Referring to FIG. 9, to provide a twist-resisting mechanism 900 at least one of the hollow guides 94, forming a stabiliser body, is slidably and rotatably connected to the column 6 via pin bearing member 901 on the hollow guide 94. The pin bearing member 901 is slidably received in an arc-like slot 902 in a bracket 903 that is fitted to the column 6. This provides a slot and bearing arrangement 904 to allow the stabiliser body and the associated actuator to rotate about a horizontal axis at pivot mount 51 but prevents torsional rotation of the stabiliser body and the associated actuator and rotation of the stabiliser body and the associated actuator about any other axis.

The slot and bearing arrangement 904 provides a reinforcement against twisting within the tabletop 8 that may be created by an operator-applied load acting on the side of the table 2. The slot and bearing arrangement 904 also minimises any buckling load acting on the stabilisers 88, 90 and elongate elements 78 of the first and second actuators 54, 56.

As shown in FIGS. 14a and 14b, the locking and/or braking mechanism 101 comprises an assembly of two oppositely oriented vertically oriented gas springs 801a, 801b. A first, lower, gas spring 801a has a free end 803a of a piston element 804a pivotally fitted to the brace mechanism 108 by a rigid plate 805 fixed to, and extending downwardly from, the brace mechanism 108. A second, upper, gas spring 801b has a free end 803b of a piston element 804b pivotally fitted to the column 6. Each gas spring 801a, 801b has a respective cylinder element 802a, 802b. The two cylinder elements 802a, 802b are connected to each other so as to be fixed together in a vertical direction. The two cylinder elements 802a, 802b may optionally additionally be (i) slidably fitted to the brace mechanism 108 or the column 6 by a sliding joint (not shown) and/or (ii) guided by a guide device (not shown), in each case to ensure vertical motion of the gas springs 801a, 801b and prevent lateral deflection of the assembly of two oppositely oriented vertically oriented gas springs 801a, 801b when under load.

In the illustrated embodiment the locking and/or braking mechanism 101 is fitted directly to the brace mechanism 108 and thereby indirectly to the linear guide mechanisms 102 to which the brace mechanism 108 is coupled. In an alternative embodiment, the locking and/or braking mechanism 101 is fitted directly to one or both of the linear guide mechanisms 102. In each embodiment, the locking and/or braking mechanism 101 can provide a locking and/or braking function between the movable framework 50, and thereby the tabletop 8, and the column 6.

FIG. 14a illustrates the position and configuration of the gas springs 801a, 801b when the movable framework 50 is at maximum height relative to the column 6. The brace mechanism 108 is in a high position and the gas springs 801a, 801b are both fully contracted. FIG. 14b illustrates the position and configuration of the gas springs 801a, 801b when the movable framework 50 is at minimum height relative to the column 6. The brace mechanism 108 is in a low position and the gas springs 801a, 801b are both fully extended.

The gas springs 801a, 801b may be controlled in known manner, for example by a solenoid control, to provide: a braking function for downward or upward movement of the movable framework 50 relative to the column 6; a lift function for raising the movable framework 50 relative to the column 6; and/or a locking function for locking the position of the movable framework 50 relative to the column 6. The double gas spring arrangement can provide a low contracted height and a high stroke, corresponding with the movement range of the movable framework 50 and the column 6.

Other locking and/or braking mechanisms will be apparent to those skilled in the art. For example, a single gas spring and solenoid actuator assembly may be provided between the movable framework and the column, and/or a rail clamp may be provided on the brace mechanism for selectively clamping, using an actuator, to one or more rails fitted to the column.

When the locking and/or braking mechanism 101 is configured to provide a lift function, the locking and/or braking mechanism 101 may comprise a second actuator mechanism coupled to the linear guide mechanism 102 and arranged to cause relative movement of the first and second parts 104, 106 thereby to raise and lower the trend axis T-T relative to the column 6.

In the surgical table 2 of the illustrated embodiment, a lifting and orienting mechanism for the trend frame 50, which is movable framework 50, is fitted around the outside of the column. The lifting and orienting mechanism comprises the first actuator mechanism 52, which in turn comprises the first and second actuators 54, 56. The first and second actuators 54, 56 can have a ballscrew or leadscrew construction.

Each respective electric motor 76 drives the respective elongate element 78 through a gearbox in the electric motor 76. The first and second actuators 54, 56 are positioned so that the trend frame 50 is supported on opposite sides of the column 6, each side extending transverse to the trend axis T-T and constituting a "front" or "rear" side of the column 6 as would be understood by those skilled in the art, at diagonally opposite corners of the trend frame 50.

The linear guide mechanisms 102 on opposite sides of the column 6 allow the central trend pivot axis T-T to be raised and lowered and act as trend pivot guides. The opposite trend pivots 118 are mounted to the linear guide mechanisms 102 and can move vertically along the direction of the column 6, guided by the linear guide mechanisms 102.

The brace mechanism 108 connects together the trend pivot guides. The brace mechanism 108 may have sufficient stiffness and resistance to twisting to brace the opposite trend pivots 118 so that the opposite trend pivots 118 are maintained at exactly the same height, although the stiffness may be enhanced by at least one linear brace guide 124 between the brace mechanism 108 and the column 6. The trend frame 50 pivots about the opposite trend pivots 118 and is located between the first and second actuators 54, 56 and the tilt frame. The trend frame 50 has a high degree of freedom of motion, as described in further detail below.

The operation of the surgical table 2 will now be described.

As described above, the surgical table 2 incorporates a mechanism for controlling the trend angle and height of a trend frame 50, which is beneath the tabletop 8. The trend frame 50 can be rotated about a trend axis, and the angle of inclination of the trend frame 50 sets the trend angle of the tabletop 8. The height of the column 6 can be controlled independently from the height of the trend frame 50.

FIGS. 2b and 4 show the column 6 at minimum height and the movable framework 50, constituting the trend frame 50, at maximum height. In this configuration, the elongate elements 78 of the first and second actuators 54, 56 and the first and second stabilisers 88, 90 are extended (and these elements are fully extended at 45 degree trend/reverse trend angles). In this configuration, the linear guide mechanisms 102 are fully extended, to provide the brace mechanism 108 in a fully raised position. The first and second stabilisers 88, 90 and the brace mechanism 108 prevent twisting of the movable framework 50 under the action of any applied load on the table 2.

The trend axis T-T is raised relative to the column 6. The movable framework 50 is raised relative to the column 6 to an uppermost position in which the movable framework 50 is above the upper end 100 of the column 6, the trend axis T-T is above the upper end 100 of the column 6, and the movable framework 50 is entirely above the upper end 100 of the column 6. The column elements 30, 32, 34 are telescoped into a contracted configuration. The movable framework 50 and the tabletop 8 are raised relative to the base 4 by the first and second actuators 54, 56.

In this configuration, the trend axis T-T is typically 410 mm above the bottom of the column 6 which is mounted on the base 4. This configuration could be used as a rest position for the surgical table 2.

When it is desired to lower the tabletop 8 even further, for example to transfer a patient onto or from the tabletop 8, the movable framework 50 can be lowered even further, which lowers the tabletop 8 supported thereby.

Accordingly, FIGS. 2a and 3 shows the column 6 at minimum height and the movable framework 50, constituting the trend frame 50, at minimum height. In this configuration, the elongate elements 78 of the first and second actuators 54, 56 are fully retracted.

The trend axis T-T is lowered relative to the column 6. The movable framework 50 is lowered relative to the column 6 to a lowermost position in which the movable framework 50 is below the upper end 100 of the column 6 and annularly surrounds the column 6. In the lowermost position the trend axis T-T is below the upper end 100 of the column 6 and extends through an upper part of the outer column element 30 and the movable framework 50 is entirely below the upper end 100 of the column 6.

In this configuration, the trend axis T-T is typically 290 mm above the bottom of the column 6 which is mounted on the base 4 and the column height is typically less than 380 mm above the base 4.

When it is desired to incline the tabletop at a trend angle, as shown in FIG. 5 the column 6 can be set at its minimum height, as described above, and the trend frame 50 can be set at an intermediate height, and with the trend frame 50 at a forward or reverse trend angle of up to 45°. The trend angle may be controlled by providing that one of the elongate elements 78 of the first and second actuators 54, 56 is retracted (in FIG. 5, second actuator 56) and the other of the elongate elements 78 of the first and second actuators 54, 56 (in FIG. 5, first actuator 54) is extended.

At the maximum trend angle of +450 or −45° (or even greater trend angle values) one of the elongate elements 78 of the first and second actuators 54, 56 is fully retracted and the other of the elongate elements 78 of the first and second actuators 54, 56 is fully extended. This provides a large range of trend angles, over an angular range of 90°, from endpoints of +450 to −45° even when the column 6 is fully retracted, and so the tabletop 8 is at a relatively low height, with the trend axis typically being no more than 410 mm above the base 4.

FIG. 6 shows the fully extended column 6 at maximum height and the movable framework 50 of the trend frame 50 also at maximum height relative to the column 6. In this configuration, the elongate elements 78 of the first and second actuators 54, 56 are extended (and these elements are fully extended at 45 degree trend/reverse trend angles). In this configuration, the linear guide mechanisms 102 are fully extended, to provide the brace mechanism 108 in a fully raised position. The trend axis T-T is raised relative to the column 6 to the uppermost position as described above.

In this configuration, the trend axis T-T is typically 945 mm above the bottom of the column 6 which is mounted on the base 4.

The above-described lifting and orienting mechanism for the trend frame 50 permits a number of different motions which can be selected by the user by controlling the first and second actuators 54, 56. The particular structural relationship between the first and second actuators 54, 56 and the trend frame 50 achieves a remarkable variety and range of motions of the trend frame 50.

The trend frame 50, and therefore the tabletop 8, can be rotated into either reverse trend or trend by driving either each of the first and second actuators 54, 56 individually or both of the first and second actuators 54, 56 at the same time in opposite directions, depending upon the initial position of the trend axis T-T relative to the column 6. Operating two trend actuators together has the benefit of increasing the speed of trend movement as a result of a reduction in the distance that each trend actuator, namely the first and second actuators 54, 56, has to drive for any given change in trend or reverse trend angle.

In particular, the trend frame 50 can be raised or lowered, with the trend frame at any given orientation, for example level, i.e. horizontally oriented. This function is achieved by driving both of the first and second actuators 54, 56 simultaneously in the same direction, i.e. extending to raise elongate element 78 or retracting to lower elongate element 78, and at the same translational rate. The position of the trend axis T-T is correspondingly raised or lowered, which raises or lowers the brace mechanism 108 coupled to the pair of linear guide mechanisms 102 fitted to the outer column element 30 of the extendable column 6.

The trend frame 50 can therefore be raised or lowered relative to the outer column element 30 of the column 6, and, independently therefrom, the outer column element 30 can be raised or lowered relative to the base 4 of the surgical table 2 since the column 6 is extendable. The cumulative effect is that the vertical motion of the trend frame 50 relative to the base 4 of the surgical table 2 can combine the vertical motion of the trend frame 50 relative to the column 6 in an additive sense with vertical motion of the extendable column 6.

The total range of vertical motion of the trend frame 50 relative to the base 4 of the surgical table 2 is very high, and higher than known surgical tables. Consequently, the lowermost position of the tabletop 8 is very low, and the highest position is very high, as compared to known surgical tables.

In addition, the trend frame 50 can be raised or lowered so as to orient the trend frame at any given orientation relative to the horizontal, i.e. to a reverse trend orientation (with the lower torso section 16 coupled to the trend frame 50 inclined so that the head section 12 of the tabletop 8 is above the leg sections 18 of the tabletop 8) or to a trend orientation (with the lower torso section 16 coupled to the trend frame 50 inclined so that the head section 12 of the tabletop 8 is below the leg sections 18 of the tabletop 8). This function is achieved, depending upon the start position of the tabletop 8 and the trend frame 50, by driving one or both of the first and second actuators 54, 56.

Figure 7B:
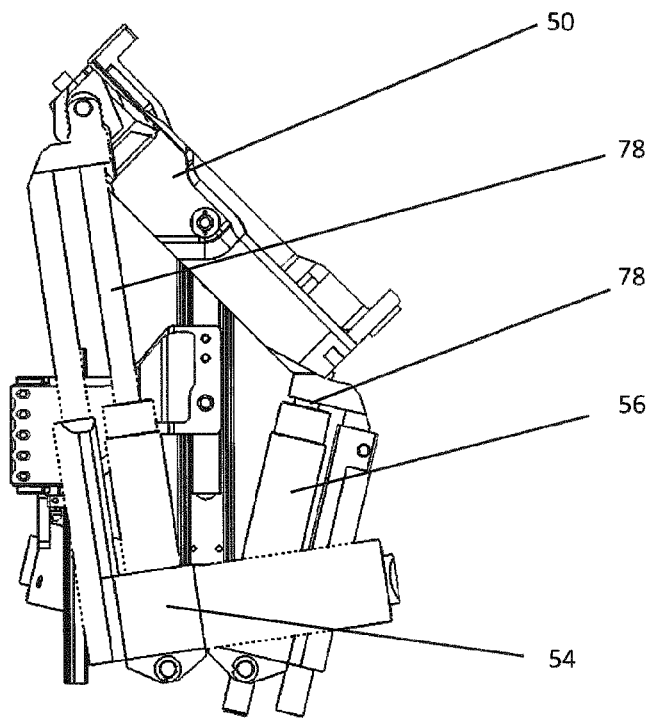
Figure 7C:
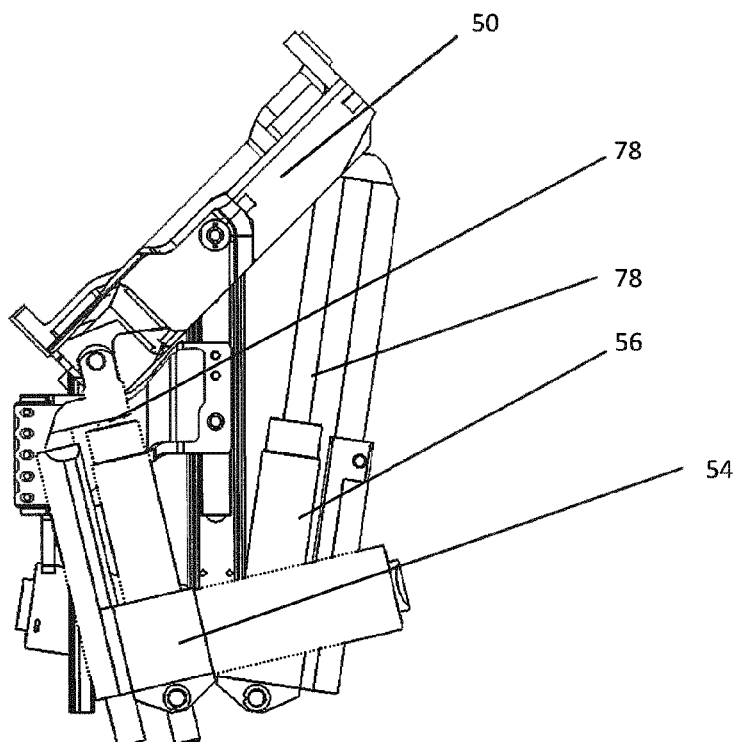

For example, if the tabletop 8 and the trend frame 50 are initially level relative to the horizontal, as shown in FIG. 7a, the first and second actuators 54, 56 can be driven simultaneously in opposite directions, i.e. extending to raise one elongate element 78 and retracting to lower the other elongate element 78, and at the same translational rate, which may be termed a symmetric mode to achieve a reverse trend position as shown in FIG. 7b or a trend position as shown in FIG. 7c.

When the first and second actuators 54, 56 are driven simultaneously in opposite directions, the vertical position of the trend axis T-T is stationary, and the trend frame 50 rotates about the trend axis T-T. Driving the first and second actuators 54, 56 simultaneously in opposite directions, provides the advantage that very fast trend, or reverse trend, movement can be achieved. The enhanced speed is achieved since both sides of the trend frame 50 are raised or lowered relative to the trend axis T-T, and so the translational distance that each of the first and second actuators 54, 56 need to extend or retract is minimised for a given change in trend angle. The reduced actuator driving distance for a given change in trend angle permits faster trend movement.

It is very desirable for the surgical table to reduce the time period to achieve a trend position, for example from a horizontal position, since in many surgical procedures it may be necessary in an emergency to put the surgical table into a trend position to maximise blood flow to the patient's head as quickly as possible.

Alternatively, the trend frame 50 can be raised or lowered so as to orient the trend frame at any given orientation relative to the horizontal, i.e. to a reverse trend orientation or to a trend orientation by driving only one of the first and second actuators 54, 56, or by driving both of the first and second actuators 54, 56 in an asymmetric mode, i.e. the first and second actuators 54, 56 are driven in other than an opposite and simultaneous manner.

Figure 8A:
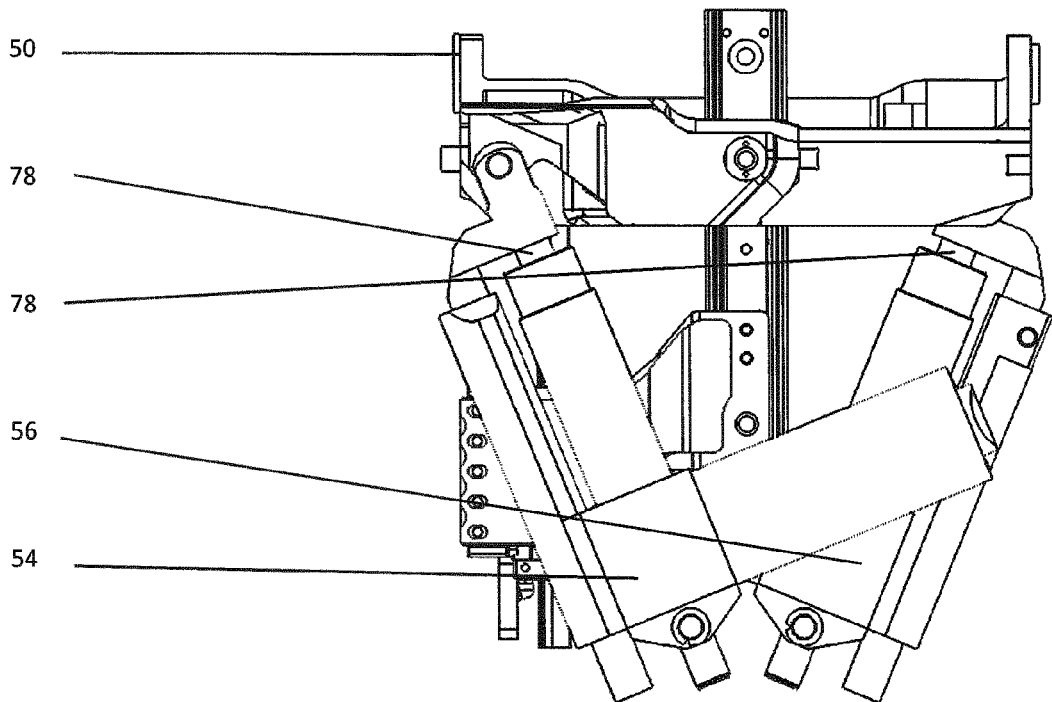
FIGS. 8a, 8b and 8c are schematic side views of the column and the mechanism for controlling the trend angle and height of the trend frame of the surgical table of FIG. 1, showing the trend axis at a minimum height and the trend frame respectively in a horizontal configuration, in a reverse trend configuration and in a trend configuration.
Figure 8B:
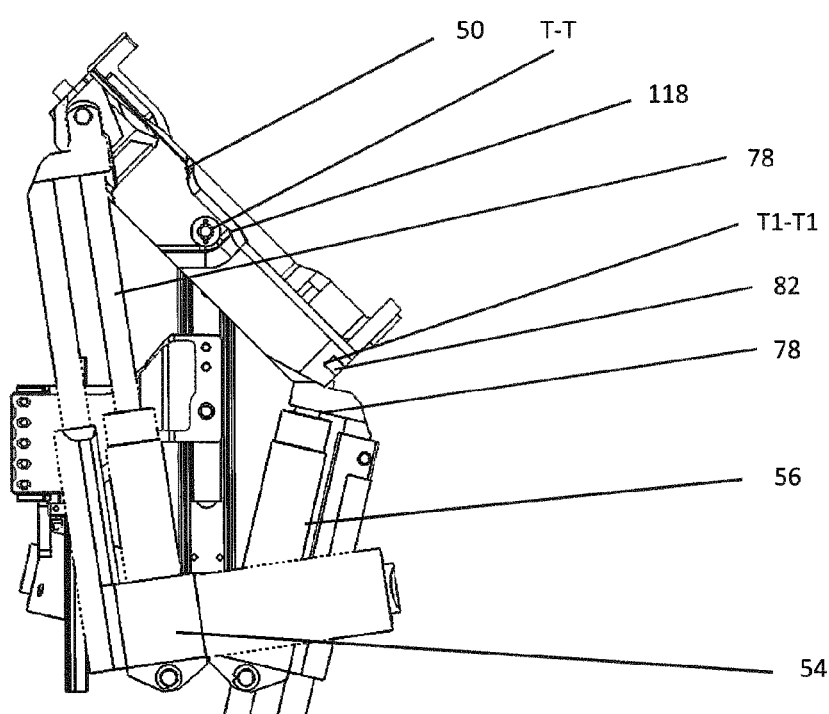

For example if the tabletop 8 and the trend frame 50 are initially level relative to the horizontal, and the tabletop 8 is at a minimum height, as shown in FIG. 8a, the second actuator 56 can be undriven so that its elongate element 78 is stationary, and remains retracted, and the first actuator 54 can be driven in an upward direction, i.e. extending to raise its elongate element 78, as shown in FIG. 8b. The pivot joint 82 of the second actuator 56 thereby defines the effective trend axis T1-T1 for the trend frame 50. The central trend axis T-T is correspondingly raised relative to the effective trend axis T1-T1 and the rotational motion of the trend frame 50 is about the effective trend axis T1-T1 rather than the central trend axis T-T.

Figure 8C:
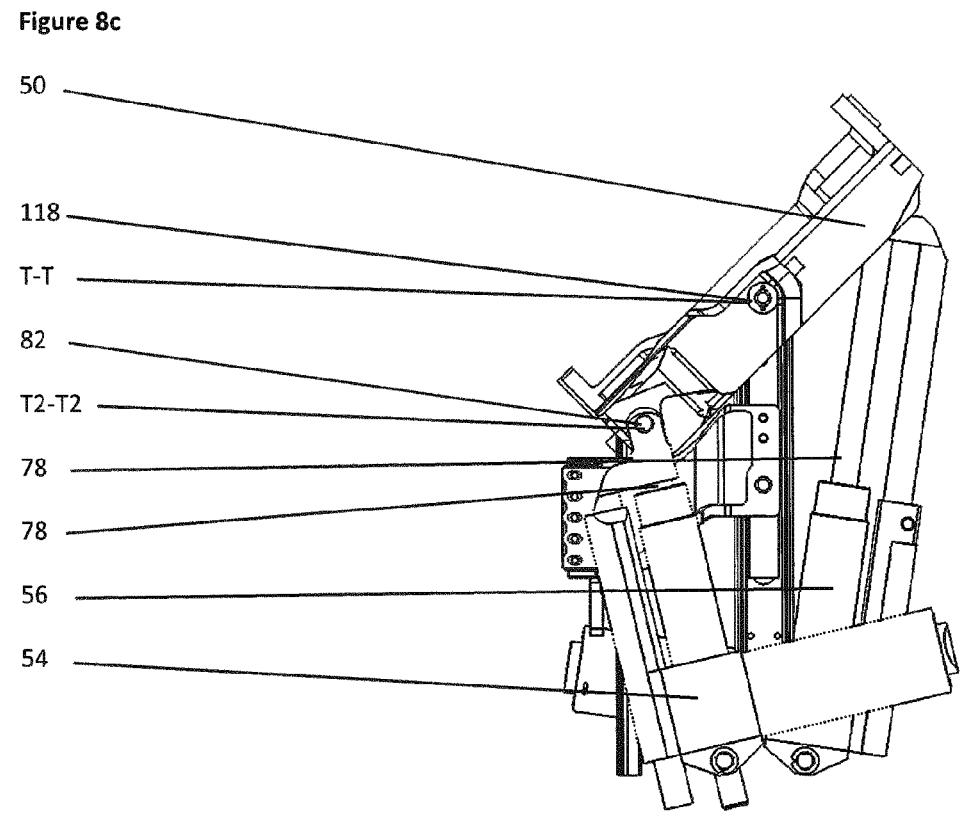

Conversely, as shown in FIG. 8c if the first actuator 54 is undriven, and remains retracted, and the second actuator 56 is driven to extend the elongate element 78, the pivot joint 82 of the first actuator 54 thereby defines a second effective trend axis T2-T2 for the trend frame 50. Furthermore, the trend or reverse trend position can be achieved by lowering one of the first and second actuators 54, 56 and keeping stationary the other of the first and second actuators 54, 56.

It may be seen that by providing a mounting for the central trend axis T-T which can move vertically, by vertical motion of the opposite trend pivots 118 which are mounted to the linear guide mechanisms 102, and by providing that the first and second actuators 54, 56 can be driven entirely independently, the effective trend axis, i.e. the axis that the trend frame 50 actually pivots about during a trend or reverse trend motion, can be selectively located at one of three positions, namely the trend pivots 118 (defining trend axis T-T), the pivot joint 82 of the second actuator 56 (defining trend axis T1-T1) or the pivot joint 82 of the first actuator 54 (defining trend axis T2-T2).

Yet further, as shown in FIG. 9, if both of the first and second actuators 54, 56 are driven simultaneously but other than both (i) in opposite directions and (ii) simultaneously, then the effective trend axis 200, i.e. the axis that the trend frame 50 actually pivots about during a trend or reverse trend motion, can be virtually located at any position between the pivot joint 82 of the first actuator 54 (T2-T2) and the pivot joint 82 of the second actuator 56 (T1-T1). For example if the first actuator 54 is raised at a velocity of X m/s and the second actuator 56 is lowered at a velocity of $-2X$ m/s, the effective trend axis 200 is virtually located at a position between the trend pivots 118 and the pivot joint 82 of the second actuator 56 (T1-T1).

It may therefore be seen that by varying the relative velocity and direction of motion of the first and second actuators 54, 56, the location of the effective trend axis, which may be at a physical pivot or at a virtual pivot, can be at any position from, and including, the physical pivot joint 82 of the first actuator 54 (defining trend axis T2-T2) to, and including, the physical pivot joint 82 of the second actuator 56 (defining trend axis T1-T1), and may be at the physical trend pivots 118 (defining trend axis T-T), or any position therebetween as a virtual pivot.

A control mechanism 150, illustrated schematically in FIG. 1 as a wireless control, may be provided to cause the height of the effective trend axis to be variable within a first dimensional range and to cause the location of the effective trend axis in a direction orthogonal to the transverse axis to be variable within a first dimensional range.

By providing an ability to select the location of the effective trend axis across the length of the trend frame 50, i.e. in a direction along the central axis C-C, the relationship between the trend/reverse trend orientations and height of the tabletop 8 has a very high freedom of movement.

For example, if the tabletop 8 is initially in a medium height horizontal position, the tabletop 8 can be driven to a trend position very quickly by simultaneously driving the first and second actuators 54, 56 in opposite directions, which lowers the head and raises the feet of the patient, and the effective trend axis would be at the physical trend pivots 118 (defining trend axis T-T).

However, if the tabletop 8 is initially in a low height horizontal position, it may not be possible further to lower the head to a trend position simply by rotating the trend frame 50 about the central trend axis T-T defined by the trend pivots 118, because the head section 12 may already be at its minimum height.

Therefore, the tabletop 8 can be driven to a trend position quickly by only driving the first actuator 54 and by keeping the second actuator 56 stationary. This inclines the entire tabletop 8, and raises the feet of the patient, but keeps the head of the patient at substantially the same height relative to the floor. The effective trend axis would be at the physical pivot joint 82 of the second actuator 56 (defining trend axis T1-T1).

This provides the advantage that the tabletop 8 can quickly attain a trend position from a low initial height merely by tilting the tabletop about a selected non-central trend axis and without requiring the entire tabletop to be raised in height; in contrast, in known surgical tables it would be necessary to raise the entire tabletop relative to the floor to achieve a trend position from an initial low tabletop starting position, which would delay and slow down the trend operation.

Conversely, if the tabletop 8 is initially in a high height horizontal position, and it is possible further to lower the head towards the floor into a trend position, the trend frame 50 may be rotated about an effective trend axis at the physical pivot joint 82 of the first actuator 54 (defining trend axis T2-T2), because the leg sections 18 may already be at their maximum height. Therefore, the tabletop 8 can be driven to a trend position quickly by only driving the second actuator 56 and by keeping the first actuator 54 stationary.

It should be clear that any non-symmetric simultaneous motion of the first and second actuators 54, 56 can locate the effective trend axis at any physical or virtual pivot in the distance extending from the physical pivot joint 82 of the first actuator 54 to the physical pivot joint 82 of the second actuator 56, which further enhances the versatility, with regard to height and speed, of achieving the trend/reverse trend orientations of the tabletop 8.

Of course, this versatility is further enhanced by providing the lifting and orienting mechanism for the trend frame

50 on the extendable column 6 which can be independently driven from the first and second actuators 54, 56 which drive the trend frame 50.

Consequently, the versatility, with regard to height and speed, of achieving the trend/reverse trend orientations of the tabletop 8 are significantly higher than as compared to known surgical tables.

FIGS. 12 and 13 show that the footprint 700 of the column 6, and the mechanism for controlling the trend angle and height of the trend frame 50, is small when the column and the mechanism are fully retracted. The footprint of the combination of both the column 6 and the first and second actuators 54, 56 typically has a length (along the longitudinal axis of the tabletop 8) of 330 mm or less and a width (along the transverse axis of the tabletop 8) of 305 mm.

Figure 15:
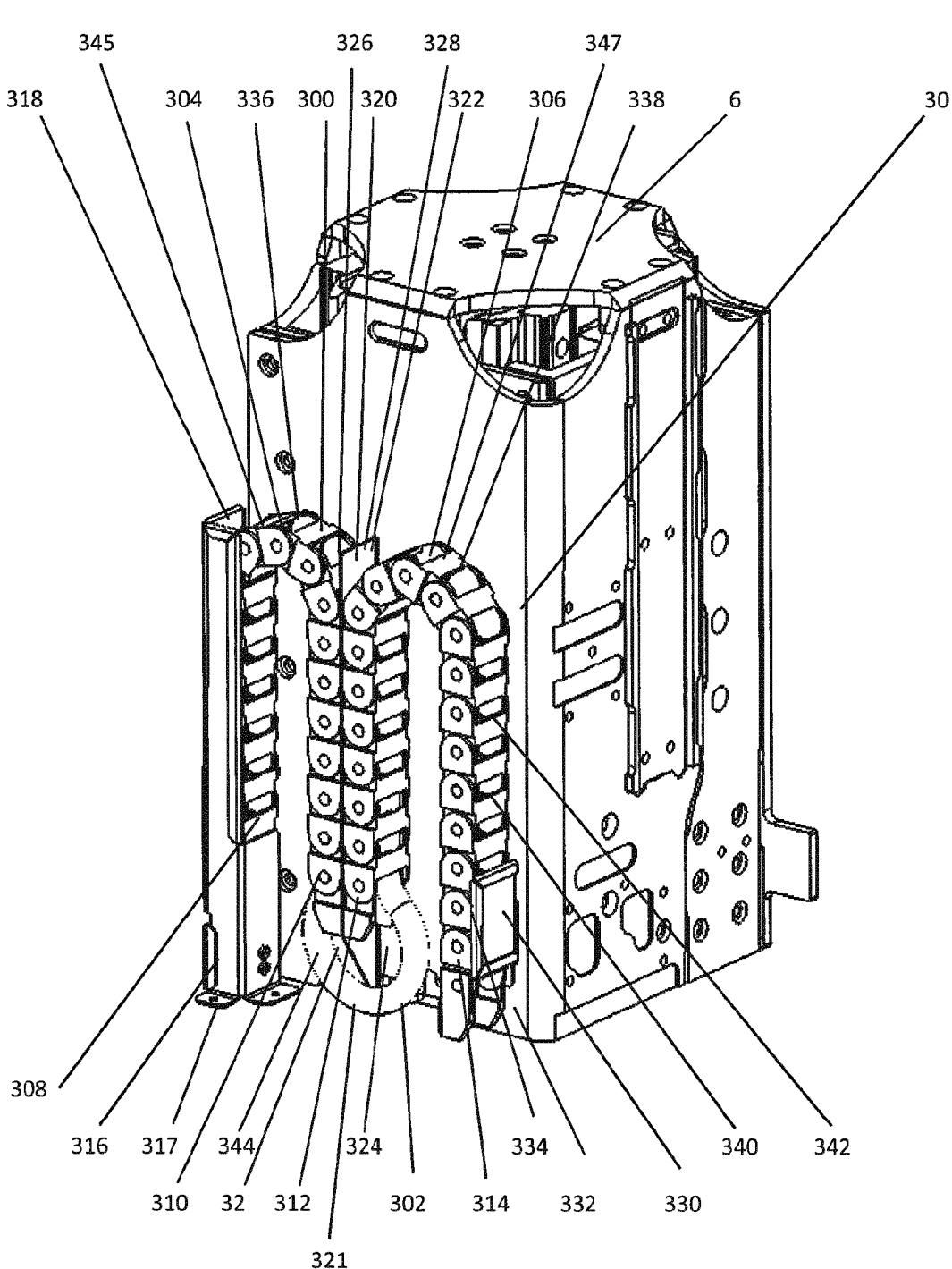
FIG. 15 illustrates a cable management system for the column of the surgical table of FIG. 1, with the column in a contracted configuration.
Figure 16:
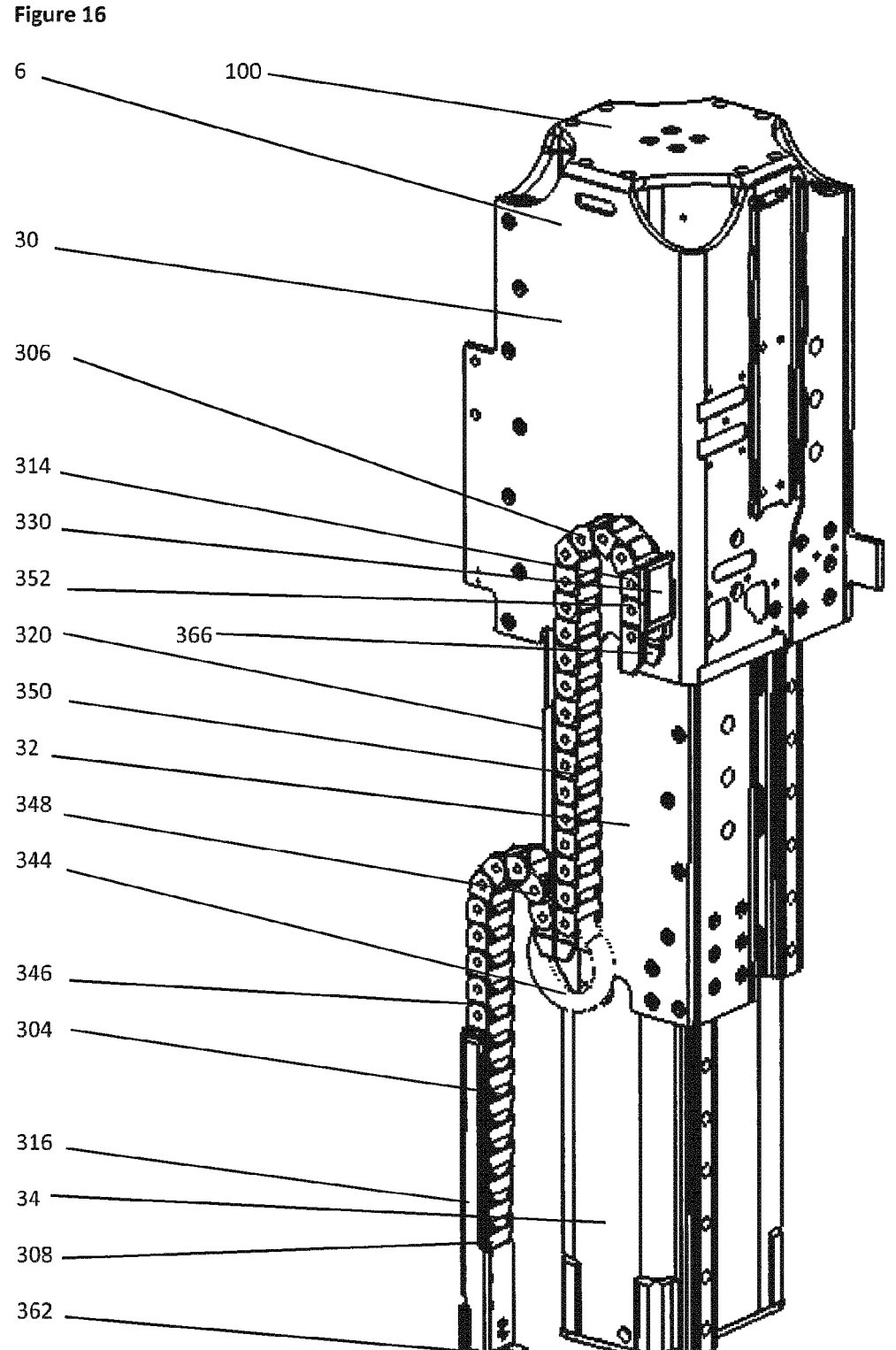
FIG. 16 illustrates the cable management system of FIG. 15, with the column in an extended configuration.
Figures 17A, 17B:
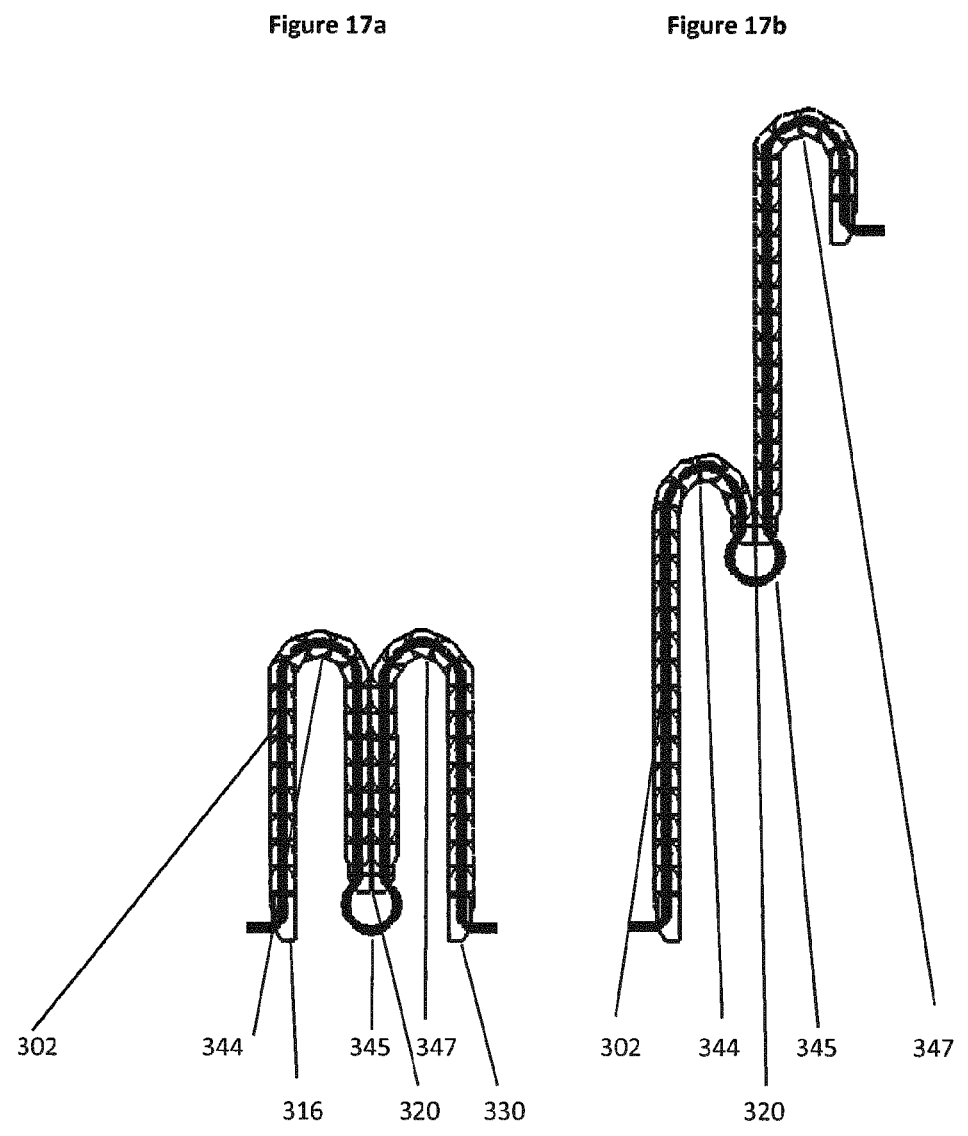

FIGS. 15, 16 and 17a and 17b illustrate a cable management system for the column 6. FIG. 15 illustrates the column in a contracted configuration and FIG. 16 illustrates the column in an extended configuration, and the cable management system 300 is configured to be retractable and extendable corresponding to the column 6 without causing a kinking and damage to cables within the cable management system 300. FIGS. 17a and 17b schematically illustrate the cable configuration when the column 6 is in the contracted or extended configuration respectively.

In the surgical table 2, power and control cables 302 need to be connected between the base 4 and the tabletop 8. The cables 302 extend up the column 6 from the base 4 to be connected as required within the tabletop 8.

A pair of flexible chain cable guides 304, 306 are provided. A first cable guide 304 has a first end portion 308 fitted, directly or indirectly, to the base 4 and a second end portion 310 fitted, directly or indirectly, to the intermediate column element 32 (or one intermediate column element 32 if there are plural telescoped intermediate column elements). A second cable guide 306 has a first end portion 312 fitted, directly or indirectly, to the intermediate column element 32 and a second end portion 314 fitted, directly or indirectly, to the outer column element 30.

The first end portion 308 of the first cable guide 304 is connected to a lower elongate bracket 316, which includes one or more fitting holes 317 for fitting the lower elongate bracket 316 to the base 4 by screws. The lower elongate bracket 316 defines an elongate guide slot 318 which is upwardly oriented and within which first end portion 308, and the adjacent portion of the first cable guide 304, are received. The lower elongate bracket 316 is fitted, directly or indirectly, to the base 4.

The second end portion 310 of the first cable guide 304 is connected to a centre bracket 320 from which extends an elongate wall 322 which is upwardly oriented. The centre bracket 320 is fitted, directly or indirectly, to a lower part 324 of the intermediate column element 32. The second end portion 310, and the adjacent portion of the first cable guide 304, can be aligned against one face 326 of the elongate wall 322.

The first end portion 312 of the second cable guide 306 is connected to the centre bracket 320 on an opposite side from the second end portion 310 of the first cable guide 304. The first end portion 312, and the adjacent portion of the second cable guide 306, can be aligned against the opposite face 328 of the elongate wall 322.

The second end portion 314 of the second cable guide 306 is connected to a higher bracket 330 which is fitted, directly or indirectly, to a lower part 332 of the outer column element 30. The higher bracket 330 defines a guide slot 334 which is upwardly oriented and within which second end portion 314 is received. The guide slot 334 of the higher bracket 330 is shorter than the elongate guide slot 318 of the lower elongate bracket 316.

The first and second cable guides 304, 306 each comprise a flexible chain 336 which is formed of a plurality of linked elements 338. The elements 338 each have a central channel portion 340 so that the resultant flexible chain 336 has a central elongate channel 342 along its length. One or more cables 302 is received in the elongate channel 342.

The cables 302 from the base 4 enter the first end portion 308 of the first cable guide 304, exit the second end portion 310 of the first cable guide 304 in the vicinity of the centre bracket 320, then enter the first end portion 312 of the second cable guide 306 and exit the second end portion 314 of the second cable guide 306 to be connected to the tabletop 8.

As shown in FIG. 15, In the vicinity of the centre bracket 320, the cables 302 hang down as a downwardly depending loop 344 from the centre bracket 320. The downwardly depending loop 344 is located at a substantially central position across a lateral width of the cable management system 300. The pair of flexible chain cable guides 304, 306 therefore provide that the cables 302 are secured in a fixed loop 344 at the central position 321, provided by the centre bracket 320, of the cable management system 330 where the cables connect together the two flexible chain cable guides 304, 306.

A generous bend radius can be provided at this central position 321 which can be equivalent to the bend radii provided at the top of each upwardly extending loop 345, 347 of the respective flexible chain cable guides 304, 306. A typical width of the cable management system 330 is about 180 mm.

As shown in FIG. 17a, in the contracted configuration of the column 6, the cables 302 have three large radius bends at loops 344, 345 and 347 and the cables 302 are fixed at three points corresponding to the lower elongate bracket 316, the centre bracket 320 and the higher bracket 330. The cables 302 generally form an m-shape. The central part of the cables 302 is guided by the centre bracket 320.

As shown in FIG. 17b, in the extended configuration of the column 6, the cables 302 still have three large radius bends at loops 344, 345 and 347. The cables 302 generally form a stepped m-shape. The central part of the cables 302 remains guided by the centre bracket 320.

As compared to a typical conventional S-shape arrangement for the cables extending up a column of a surgical table, in which the cables are not directly supported at the centre of the S-shape, the central bracket prevents the cables and associated cable guides from sagging at the central position. This minimises stress at the central position, as the central position is driven by the column and therefore the cables are fully supported at the centre. This also reduces cable stress at the top loop 347.

In the illustrated embodiment, first and second cable guides 304, 306 are provided and these may be provided by two individual cable guides that intersect at the centre bracket 320, or alternatively a single cable guide member is provided which is bent at the centre bracket 320 to form the first and second cable guides 304, 306.

The first and second cable guides 304, 306 are composed of a polymer, for example polypropylene. These cable guides are known in the art, and a suitable cable guide is sold on commerce under the trade mark "energy chain @" by Igus (UK) Limited of Northampton, UK.

In the contracted configuration the first and second cable guides 304, 306 are laterally adjacent, and form a shape of an inverted W, and the cable management system 300 has a minimum total height, and in the extended configuration the second cable guide 306 is substantially above the first cable guide 304 and the cable management system 300 has a maximum total height.

As shown in FIG. 15, when the column 6 is in the contracted configuration, each of the first and second cable guides 304, 306 is in a contracted configuration and has a minimum total height. Also, since the first and second cable guides 304, 306 are in a side-by-side configuration because the lower part 324 of the intermediate column element 32 and the lower part 332 of the outer column element 30 are aligned and adjacent to the base 4, the total height of the entire cable management system 300 is minimised.

As shown in FIG. 17a, the first and second cable guides 304, 306 are each configured to be, in the contracted configuration, in the form of an inverted U, and thereby have substantially parallel pairs of upright opposed legs 346, 348 and 350, 352 of substantially the same length. Each pair of legs 346, 348 and 350, 352 is interconnected at the respective upper ends 354, 356 by a transverse interconnection 358, 360. In the illustrated embodiment, in which the column 6 has a contracted height of typically less than 380 mm, the first and second cable guides 304, 306 each have a contracted height of typically 250 mm.

In the contracted configuration, the elongate guide slot 318 of the lower elongate bracket 316, the elongate wall 322 of the centre bracket 320, and the guide slot 334 of the higher bracket 330 all assist the first and second cable guides 304, 306 assuming the desired contracted configuration of minimum total height and with the first and second cable guides 304, 306 being each configured in the form of an inverted U. This avoids damage and kinking of the cables in the contracted configuration.

As shown in FIGS. 16 and 17b, in contrast, when the column 6 is in the extended configuration, each of the first and second cable guides 304, 306 is in an extended configuration and has a maximum total height. The first and second cable guides 304, 306 are each configured in the form of an inverted J. The opposed legs 346, 348 and 350, 352 of each pair have different length. In the first cable guide 304, the leg 346 connected to the base 4 is longer than the leg 348 connected to the intermediate column element 32. In the second cable guide 306, the leg 350 connected to the intermediate column element 32 is longer than the leg 352 connected to the outer column element 30.

In the illustrated embodiment, in which the column 6 has a contracted height of typically less than 380 mm, the total extended height from the cable entrance 362 of the first cable guide 304 at first end portion 308 to the cable exit 366 from the second cable guide 306 at second end portion 314 is typically 525 mm.

In the extended configuration, the elongate guide slot 318 of the lower elongate bracket 316, the elongate wall 322 of the centre bracket 320, and the guide slot 334 of the higher bracket 330 again all assist the first and second cable guides 304, 306 assuming the desired extended configuration of maximum total height and with the first and second cable guides 304, 306 being each configured in the form of an inverted J with substantially parallel legs. Again, this avoids damage and kinking of the cables in the extended configuration, and when transitioning between the extended configuration and the contracted configuration.

The lower elongate bracket 316, the centre bracket 320, and the higher bracket 330 are typically composed of sheet metal. These brackets prevent excess cable pressure, otherwise generated by the spring tension in the cables, particularly when the cables are bent around a tight radius. Such excess cable pressure would cause unwanted lateral movement and sagging of the first and second cable guides 304, 306.

The cable management system 330 enables a low contracted height to be achieved in combination with a high stroke. The cables can be connected from the base 4 to the top section of the column 6 without requiring the cables to extend upwardly along the full contracted height of the column.

In the extended position, the cables connect securely to the top element 30 of the column 6 but the uppermost part of the cable management system 300 remains located a distance significantly below the upper end 100 of the column 6.

This assists minimising the footprint of the column 6 and assists permitting clearance for other table components, particularly the trend frame 50, in extreme trend positions.

Figure 18:
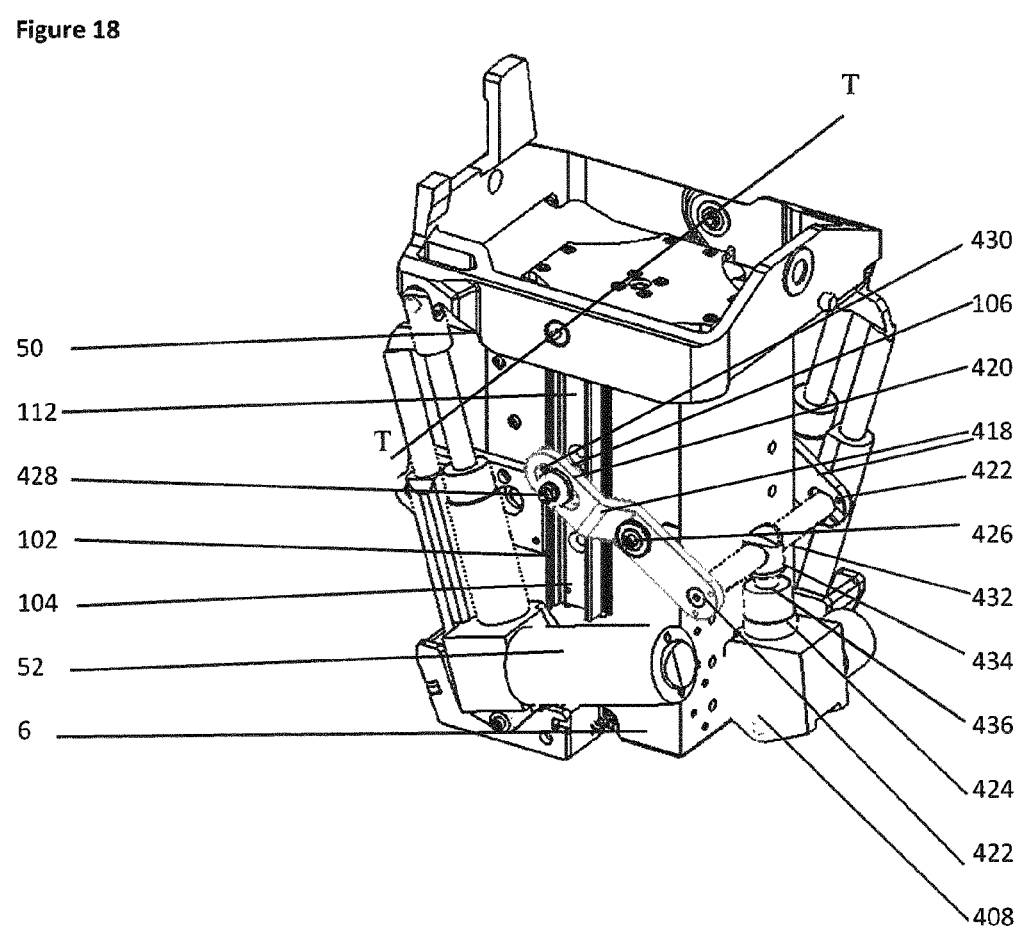
FIG. 18 is a schematic perspective side view from above of a column and a mechanism for controlling the trend angle and height of a trend frame of a surgical table in accordance with a further embodiment of the present invention.

In an alternative embodiment of the present invention, as illustrated in FIG. 18, instead of the brace mechanism there is provided a second actuator mechanism 408 which is coupled to the linear guide mechanism 102. The brace mechanism is passive and unpowered, and in that embodiment the power for lifting and tilting the trend frame 50 is provided by the first and second actuators.

In the embodiment comprising the second actuator mechanism 408, the second actuator mechanism 408 is active and powered, and in this embodiment additional power, additional to that provided by the first and second actuators, for lifting and tilting the trend frame 50 is provided by the second actuator mechanism 408.

Although only one linear guide mechanism 102 may optionally be provided, in the illustrated embodiment the second actuator mechanism 408 is arranged to cause relative movement of the first and second parts 104, 106 thereby to raise and lower the trend axis T-T relative to the column 6. Like the first actuator mechanism 52, the linear guide mechanism 102 and second actuator mechanism 408 are external of the column 6. The second actuator mechanism 408 comprises a pivotable arm 418 having a first end 420 pivotally attached to the second part 106 and a second end 422 pivotally coupled to a third linear actuator 424. The arm 418 is pivoted about a pivot 426 located between the first and second ends 420, 422 and fixed to the column 6. A pin 428 is mounted on the second part 106 and the first end 420 has a slot 430 in which the pin 428 is received. The pin 428 is slidable along the slot 430 when the arm 418 is pivoted about the pivot 426.

In the illustrated embodiment two linear guide mechanisms 102 are provided on opposite sides of the column 6, and correspondingly the second actuator mechanism 408 comprises two pivotable arms 418, each pivotable arm 418 being attached to a respective second part 106 and coupled to the third linear actuator 424. The second end 422 of each pivotable arm 418 is pivotally coupled to the third linear actuator 424 by a drive rod 432 which is pivotally fitted between the second ends 422. The drive rod 432 is pivotally fitted to a movable end 434 of an elongate linear drive member 436 of the third linear actuator 424.

The arrangement is such that linear movement of the third linear actuator 424 causes rotation of the arm 418 about the pivot 426 and movement of the second part 106 thereby to raise and lower the trend axis T-T relative to the column 6. Typically, the second actuator mechanism 408 incorporates a locking mechanism for locking the trend axis T-T at a selected height position relative to the column 6, the locking mechanism being incorporated within the third linear actuator 424.

When it is desired to raise the trend axis T-T relative to the column 6, the elongate linear drive member 436 of the third linear actuator 424 is retracted so that the pivotable arms 418 are rotated (in a clockwise direction in the Figure) to push up the movable linear guide member 112, coupled to the movable framework 50 at the trend pivot.

When it is desired to lower the trend axis T-T relative to the column 6, the elongate linear drive member 436 of the third linear actuator 424 is extended so that the pivotable arms 418 are rotated (in an anti-clockwise direction in the Figure) to push down the movable linear guide member 112, coupled to the movable framework 50 at the trend pivot.

Figure 19:
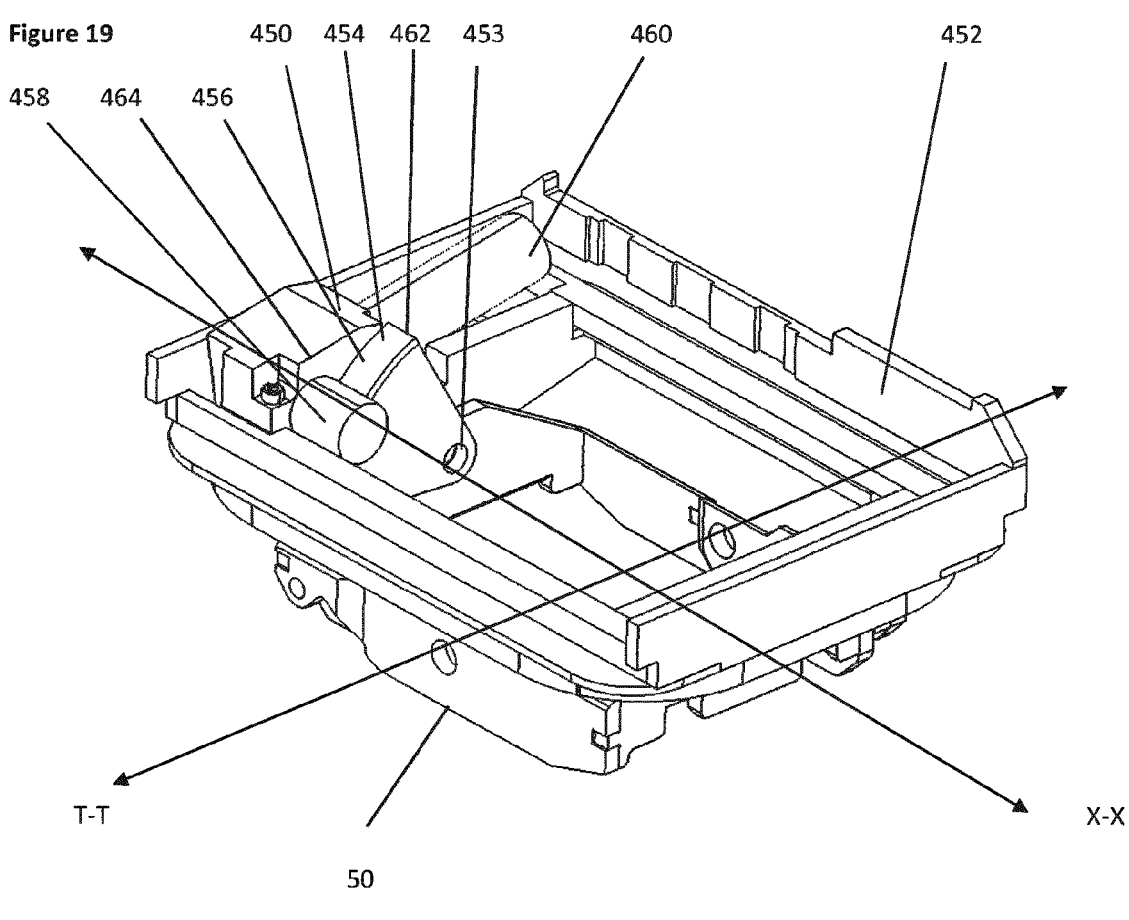
FIG. 19 is a schematic perspective view of a tilt mechanism of a surgical table in accordance with an embodiment of the present invention.
Figure 20A:
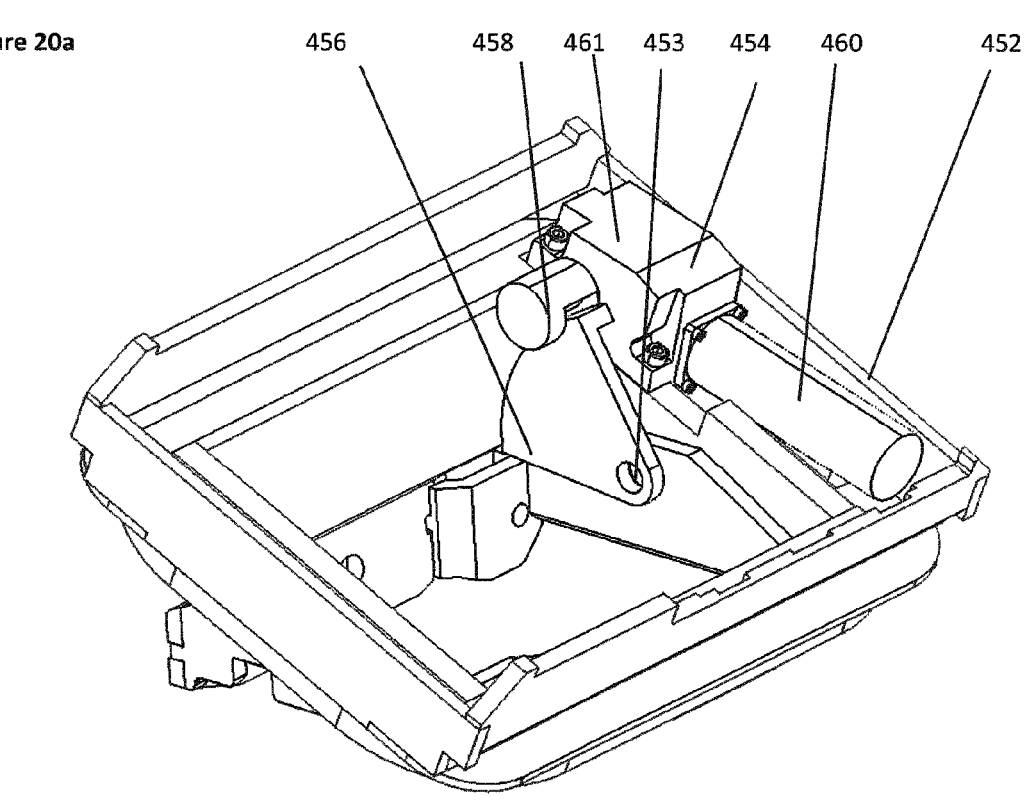

Referring to FIG. 19, there is shown a schematic perspective view of a tilt mechanism 450 of the surgical table 2 in accordance with a further embodiment of the present invention. FIGS. 20a and 20b illustrate a tilt frame 452 of the tilt mechanism 450 rotated about the tilt axis X-X at two opposite end positions relative to a central level position.

As described above, the surgical table 2 has a trend mechanism for enabling at least a part of the tabletop 8 to be independently rotated about the trend axis T-T which extends in a transverse direction across the tabletop 8. The trend mechanism enables at least a part of the tabletop 8 to be rotated about the trend axis T-T. The tilt mechanism 450 is located between the tabletop 8 and the trend mechanism for enabling at least a part of the tabletop 8 to be independently rotated about the tilt axis X-X which extends in a longitudinal direction along the tabletop 8. The tilt frame 452 is located above the trend axis T-T.

The tilt axis X-X extends through the tilt frame 452 comprising a second movable framework. As described above, the trend and tilt mechanism comprises the trend frame 50, which comprises a first movable framework mounted to at least one of the base 4 and the column 6. A first drive system, comprising the first and second actuators 54, 56, is fitted between the trend frame 50 and at least one of the base 4 and the column 6 for rotating the trend frame 50 about the trend axis T-T.

The tilt frame 452, which comprises a second movable framework, is mounted between the trend frame 50 and the tabletop 8. The tilt axis X-X extends through the trend frame 50 and the tilt frame 452. A pivotable connection 453 is oriented along the tilt axis X-X and interconnects the trend frame 50 and the tilt frame 452. Typically, the trend frame 50 is located within the tilt frame 452.

The tilt axis X-X is above the trend axis T-T. The tilt frame 452 is above the trend frame 50. The tilt frame 452 surrounds the trend frame 50. The trend frame 50 and the tilt frame 452 are annular and the tilt frame 452 annularly surrounds the trend frame 50.

A second drive system 454 is fitted between the trend frame 50 and the tilt frame 452 for rotating the tilt frame 452 about the tilt axis X-X. The second drive system 454 is adapted to rotate the tilt frame 452 about the tilt axis X-X over a tilt angle range of at least 50°, for example by a tilt angle of at least +/−250 from a central level position. Typically, the second drive system 454 is fitted within the tilt frame 452 above the trend axis T-T.

Accordingly, the second drive system 454 is a drive arrangement to allow table top tilt movement. The tilt frame movement is independent to and isolated from trend movement unlike some systems used on conventional operating tables where the tilt and trend drive actuators are both connected back to the column. With the latter conventional arrangement, trend movement can instigate small amounts of tilt movement without the tilt drive being operated, which is not desirable.

With the structural arrangement of the preferred embodiments of the present invention, the tilt frame 452 is intentionally fitted outside of the trend frame 50 and rotates about the trend frame 50 and not the column 6. This structural arrangement prevents skewing of the tabletop 8, i.e. the tabletop being moved out of line with the longitudinal axis of the base 4) when both trend and tilt are applied, that would otherwise occur if the tilt frame was fitted inside the trend frame to rotate about the column and with the trend frame rotating about the tilt frame.

In the embodiment illustrated in FIG. 19, and FIGS. 20a and 20b, the second drive system 454 comprises a rack and pinion drive system 454. The rack and pinion drive system 454 comprises a curved rack 456 fitted to the trend frame 50, a rotatable pinion 458 fitted to the tilt frame 452 and a drive motor 460 connected to the pinion 458 for rotating the pinion 458. In this embodiment, the pinion 458 is located above the rack 456. The drive motor 460, with gearbox 461, is fitted to the tiltframe 452.

The curved rack 456 typically has a diameter of at least 100 mm, optionally from 100 to 110 mm. Typically, an uppermost portion 462 of the curved rack 456 is no more than 105 mm above the tilt axis X-X, optionally from 95 to 105 mm above the tilt axis X-X.

The second drive system 454 preferably further comprises helical or split gears between the drive motor 460 and the pinion 458. In addition, the rack 456 and pinion 458 preferably have respective helical teeth which mutually engage between the rack 456 and pinion 458.

These features are preferably provided to minimise backlash in the tilt mechanism 450, which therefore minimises movement or free play in the tabletop 8. The position of the pinion 458 relative to the rack 456 may be adjustable so that a close mesh between the rack 456 and pinion 458 can be reliably achieved.

Preferably, the tilt mechanism 450 also comprises a force applicator 414 which can be switched between an operative mode in which a force is applied to the rack and pinion drive system tilt mechanism 450 to enhance engagement between the rack 456 and pinion 458 and an inoperative mode in which the force is not applied or is reduced as compared to the operative mode.

In an alternative embodiment illustrated in FIG. 21, a rack and pinion drive system 504 comprises a curved rack 506 which is located above the pinion 508. The curved rack 506 fitted to the trend frame 50, the rotatable pinion 508 is fitted to the tilt frame 502 and a drive motor 510, fitted to the tilt frame 502, is connected to the pinion 508 for rotating the pinion 508.

Again, the curved rack 506 typically has a diameter of at least 100 mm, optionally from 105 to 115 mm. Typically, an uppermost portion of the curved rack 506 is less than 105 mm above the tilt axis X-X, optionally from 80 to 90 mm above the tilt axis X-X.

In the embodiments of FIGS. 19 to 21, as shown in FIG. 19, at least one damper element 412 (schematically illustrated) may be fitted between the trend frame 50 and the tilt frame 452 for damping the motion of the tilt frame 452 about the tilt axis X-X. The damper element 412 typically comprises a gas spring or a rotary damper. In addition, a braking system 414 (schematically illustrated) may be fitted to the tilt frame 452 for braking the motion of the tilt frame 452 about the tilt axis X-X. Typically, the braking system 414 comprises an electrical brake.

The embodiments of FIGS. 19 to 21 provide a drive arrangement to allow table top tilt movement. The tilt frame 452 movement is independent to, and isolated from, the trend frame 50 movement. In contrast, some systems used on conventional surgical operating tables provide that the tilt and trend drive actuators are both connected back to the column; with such an arrangement, trend movement can instigate small amounts of tilt movement without the tilt drive being operated, which introduces clearly undesirable tilt movement.

The embodiments of FIGS. 19 to 21 also provide that the tilt frame 452 is fitted outside of the trend frame 50 and rotates about the trend frame 50 and not the column 6. This prevents the tabletop skewing (i.e. the tabletop being moved out of line with the longitudinal axis of the base) when both trend and tilt are applied, that would otherwise occur if the tilt frame is fitted inside the trend frame and rotates about the column with the trend frame rotating about the tilt frame.

The tilt drive mechanism includes a motor and gearbox drive unit with a curved rack and pinion arrangement to allow tilt movement of the tabletop over a tilt angle range. The tilt angle range is a minimum of 25° in either direction from a level position, providing a minimum total tilt angle movement of at least 50°. The large rack diameter enables high torque transmission loads to be achieved in combination with a low overall height for the combination of the trend and tilt mechanism and the column, for example having a vertical distance of less than 105 mm from the top of the curved rack to the tilt pivot axis T-T. This small vertical height of the tilt drive mechanism helps to achieve a low minimum overall tabletop height, typically less than 510 mm from the floor to top of table top, in conjunction with the trend mechanism and column as described with reference to FIGS. 1 to 14.

In a further embodiment, as illustrated in FIG. 22, the tilt drive system 600 comprises a belt drive system 604. As shown in FIG. 22, the belt drive system 604 comprises an endless belt 606 fitted to the tilt frame 602 via a rotatable driven element 612 such as a pulley wheel. A rotatable drive element 608, such as a pulley wheel, is fitted to the trend frame 50 and engages the belt 606. A drive motor 610 is connected to the rotatable drive element 608 for rotating the drive element 608. As the drive motor 610 rotates the drive element 608 in one of two opposite rotational directions, the endless belt 606 correspondingly rotates the rotatable driven element 612 and rotates the tilt frame 602 about a desired tilt angle in a desired tilt direction. Alternatively, the endless belt may be fitted to the trend frame 50 and the rotatable drive element is fitted to the tilt frame 602.

Figure 25:
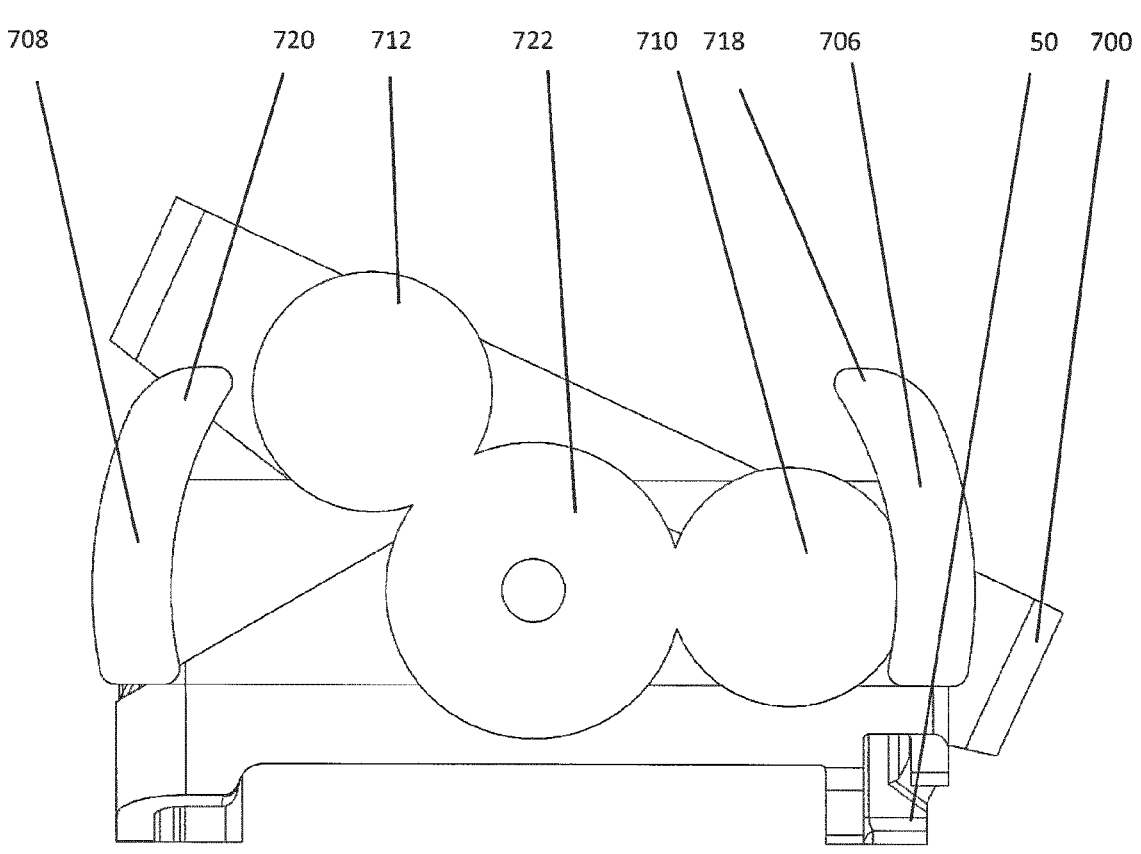
FIG. 25 is a schematic side view of the tilt mechanism of FIG. 23 with the tilt frame in an inclined configuration.

A further embodiment of the present invention is illustrated in FIGS. 23, 24 and 25. According to this embodiment, as for the first embodiment, a surgical table comprises a base for standing on a floor; a column mounted on and extending from the base; and a tabletop providing a patient support surface. As shown in FIGS. 23, 24 and 25, a movable framework 700 is provided to which at least a part of the tabletop (not shown) is directly or indirectly fitted. A rack and pinion mechanism 702 is fitted to the movable framework 700 between the tabletop and the column for enabling the movable framework 700, and the part of the tabletop fitted thereto, to be rotated about a pivot axis 704.

In the illustrated embodiment, the pivot axis 704 is a tilt axis extending in a longitudinal direction along the tabletop, and the movable framework 700 is a tilt frame 700 pivotally fitted around a trend frame 50 as described above for the embodiment of FIGS. 2 to 17b.

The rack and pinion mechanism 702 comprises a pair of opposed first and second curved racks 706, 708 mounted on opposite sides of the pivot axis 704. The racks 706, 708 face inwardly towards the pivot axis 704 and are oriented upwardly. A pair of first and second rotatable pinions 710, 712 is provided, and each first and second pinion 710, 712 arranged to engage a respective first and second curved rack 706, 708. Each curved rack 706, 708 typically has a radius of at least 200 mm, optionally from 200 to 230 mm. Each pinion 710, 712 typically has a radius of at least 30 mm, optionally from 30 to 45 mm, for example about 38 mm.

In this embodiment, the movable framework 700 is a first movable framework, in particular a tilt frame pivotable about the tilt axis, and the curved racks 706, 708 are fitted to a second movable framework, in particular a trend frame pivotable about the trend axis, located beneath the first movable framework 700.

A drive system 714, including a drive motor 716 and gearbox 717, is connected to the pinions 710, 712 for rotating the first and second pinions 710, 712 in a common rotational direction. In other words, as shown in the side views of FIGS. 23 and 24, when the first pinion 710 is rotated in a clockwise direction, the second pinion 712 is rotated in a clockwise direction, and vice versa. The drive system 714 is configured so that the first and second pinions 710, 712 move in opposite respective upward or downward directions along the respective first and second curved racks 706, 708 to rotate the movable framework 700 about the pivot axis 702.

The drive system 714 is fitted to the movable framework 700. The first and second pinions 710, 712 are fitted to the movable framework 700. The curved racks 706, 708 are fitted to the trend frame. The drive system 714 comprises a primary drive wheel 722 which is coupled, directly as illustrated or by additional gear wheels (not shown), to the first and second pinions 710, 712. The drive motor 716 is adapted to be driveable in opposite rotational directions to rotate the primary drive wheel 722 in opposite rotational directions and thereby pivot the movable framework 700 in opposite rotational directions.

The movable framework 700 is configured to be pivotable about the pivot axis 704 in opposite rotational directions about a central position of the movable framework, 700. In the central position, the first and second pinions 710, 712 each engage the respective first and second curved racks 706, 708, as shown in FIGS. 23 and 24.

Furthermore, the first and second pinions each engage the respective first and second curved racks 706, 708 over a preset angular range of the movable framework 700 about the central position. Typically, the preset angular range extends to at least +/−5° about the central position, for example at least +/−7° about the central position.

Outside the preset angular range, as shown in FIG. 25 an upper pinion of the first and second pinions 710, 712 is above, and out of contact with, the respective first and second curved rack 706, 708 and the lower pinion of the first and second pinions 710, 712 remains engaged with the respective first and second curved rack 706, 708.

Each curved rack 706, 708 has an upper free end 718, 720 and the respective first and second pinion 710, 712 is configured to be located above the respective first and second curved rack 706, 708 outside the preset angular range.

In an alternative embodiment, the movable framework 700 is configured to be pivotable about the trend axis extending in a transverse direction across the tabletop. The pivot axis 702 is the trend axis. The curved racks 706, 708 are fitted to the column and are in a fixed position relative to the column.

The twin rack and pinion inclination mechanism of FIGS. 23, 24 and 25, whether used to incline a tilt frame about a tilt axis, with the tilt frame mounted on a trend frame, or whether used to incline a trend frame about a trend axis, with the trend frame mounted on a column or a tilt frame, provides a number of advantages. In particular, by providing a twin rack and pinion inclination mechanism, at low inclination angles both pinions are engaged with a respective curved rack, so the load on each rack/pinion is low, but the total load and torque applied by the pair of racks and pinions can be very high. Furthermore, the diameter of each curved rack can be high, and the diameter of the pinions can also be high, and so the number of teeth engaged between each rack and associated pinion can also be high, thereby enhancing the contact area between the rack and pinions to allow high torque transmission. These high torques can be achieved at low angles of inclination of the movable framework, while keeping the height of the torque transmission system low.

When used for inclining a trend frame, the twin rack and pinion inclination mechanism of FIGS. 23, 24 and 25 can be fitted around a column, for example when the trend pivot is fitted to the column, and below the top of the column. This provides the advantage of a low overall tabletop height.

The preferred embodiments of the present invention can provide that the ancillary actuator for controlling the height of the trend axis relative to the column can be locked, either directly by a locking mechanism therein or by using a separate braking mechanism. This minimises undesirable lateral movement or free play in the tabletop.

It may therefore be seen that the preferred embodiments of the present invention can provide a highly versatile column and trend mechanism which can provide a wide range of trend angles and a wide range of tabletop heights in a compact unit having a small footprint. The column has a small footprint yet high loading capacity and high torsional rigidity. The column has a small height yet a high stroke.

In the preferred embodiments of the present invention, leadscrew actuators are used in which the lifting load is entirely through the leadscrews. Accordingly, no rotary bearings are required to support the load on the tabletop.

In the preferred embodiments of the present invention, the trend frame actuators can be driven synchronously with column height adjustment.

In the preferred embodiments of the present invention, position sensors can be integrated into the column sections.

The preferred embodiments of the present invention can provide a minimum tabletop height (excluding mattress thickness) of no greater than 510 mm from the floor surface.

The preferred embodiments of the present invention can provide a minimum column height of less than 380 mm from the base of the surgical table. The trend pivot is below the top of the column and is less than 290 mm from the base of the surgical table. A low minimum tabletop height is achieved because component or assemblies above the column can be lowered directly onto the column without the need for clearance above the column. In contrast, in a conventional surgical table design with fixed trend pivot positions, clearance above the column is required to allow for trend and tilt movement. By providing an adjustment of the position of the trend pivot relative to the column height, the height adjustment of the tabletop can be increased compared to the height adjustment of only the column, while still facilitating a low minimum tabletop height.

The contracted height to stroke ratio is maximised by using through-spindle electric actuators, in which the screw can be driven through the gearbox, in the preferred embodiments of the invention. This in turn provides that a low table height and large trend angles can be achieved. The use of such actuators provides that the gearbox does not add to the height of the actuator compared to conventional actuators that have the screw connected directly above the gearbox.

The preferred embodiments of the present invention can also provide a tabletop height adjustment range of up to 645 mm.

The preferred embodiments of the present invention can provide that the ratio of the overall column and trend frame height extension to the minimum height of the column and trend frame is far higher than is currently achieved by any commercially available surgical table. For example, the surgical table of the present invention can provide that the ratio between the extended maximum height of the tabletop from the floor and the retracted minimum height of the tabletop from the floor is at least 2.1, and typically greater than 2.25. These dimensions can provide a trend pivot centre height, from the base of the surgical table, with a maximum/minimum ratio of at least 3.22 (calculated as [(290+645)/290]). Correspondingly, these dimensions can provide a trend pivot centre height, from the floor, with a maximum/minimum ratio of at least 2.26 (calculated as [(510+645)/510]).

The preferred embodiments of the present invention can also provide a column height adjustment range of at least 525 mm.

The preferred embodiments of the present invention can also provide a vertical lifting capacity of 550 kg and an offset loading moment capacity of at least 1600 Nm.

The preferred embodiments of the present invention can provide large, steep trend angles of at least 45 degrees, typically up to 900 from endpoints of +450 to −45°, at low column heights while still providing sufficient clearance for table coverings and ancillary components around the column. The trend axis, and trend frame, can be raised above the column to provide a high level of clearance from the column to permit large trend angles even at low tabletop heights.

The preferred embodiments of the present invention can provide two actuators which support offset loads on the trend frame, which improves the dynamic lifting performance and offset loading capacity at a given trend angle. Furthermore, more compact and less powerful actuators can be employed to achieve a high dynamic performance.

The preferred embodiments of the present invention can provide a stabiliser system which minimises lateral loading on the actuators for raising the trend frame and varying the trend angle, providing that the actuator loading is primarily in line with the axis of the elongate element of the actuator. This reduces bucking loads on the actuators, particularly at high extension dimensions, for example up to 210 mm, for the elongate element of the actuator. The stabiliser system can enable the use of smaller diameter elongate elements of the actuators, with correspondingly smaller drive systems and gearboxes, permits a smaller footprint, large tilt and trend angles and maximum patient imaging on opposite sides of the column. The stabiliser system can also minimise free play or movement in the tabletop by minimising lateral movement in the actuator system. Hard end stops may be integrated into the stabiliser system to securely limit the effective range of movement of the actuators. Position sensors can be integrated into the stabiliser system, remote from the actuators and the associated drive systems.

Various modifications can be made to the above-described embodiments without departing from the scope of the present invention, which is defined by the claims.

The invention claimed is:

1. A surgical table comprising:
a base for standing on a floor;
a column of adjustable height mounted on and extending from the base;
a tabletop providing a patient support surface;
a movable framework mounted between the tabletop and the column for enabling at least a part of the tabletop to be rotatable about a trend axis extending in a transverse direction across the tabletop;
a linear guide mechanism extending along at least a part of the column, the linear guide mechanism comprising a first part coupled to the column and a second part coupled to the movable framework, the first and second parts being relatively movable along a linear axis of the linear guide mechanism to enable the movable framework to be translated along the linear axis by relative movement of the first and second parts;
a first actuator mechanism coupled to the movable framework and arranged to raise and lower the movable framework relative to the column and to rotate the movable framework about the trend axis; and
a second actuator mechanism coupled to the linear guide mechanism and arranged to cause relative movement of the first and second parts thereby to raise and lower the trend axis relative to the column.

2. A surgical table according to claim 1, wherein the first actuator mechanism comprises first and second actuators, the first actuator being connected to a first portion of the movable framework and the second actuator being connected to a second portion of the movable framework, the first and second portions being mutually spaced and located on opposite sides of the trend axis.

3. A surgical table according to claim 2, wherein the first and second portions are located on opposite sides of a central axis orthogonal to the trend axis and extending through the movable framework.

4. A surgical table according to claim 2, wherein the movable framework is substantially rectangular and the first and second portions are located at diagonally opposite corners of the movable framework.

5. A surgical table according to claim 2, wherein the first and second actuators are the only actuators coupled between the column and to the movable framework for causing movement of the movable framework relative to the column.

6. A surgical table according to claim 2, wherein the first and second actuators are each inclined at a respective acute angle in opposite directions from a plane including a longitudinal axis of the column and the trend axis so that an upper first end of each of the first and second actuators is oriented further from the plane than a respective lower second end.

7. A surgical table according to claim 2, wherein the first actuator has an upper first end connected to a first portion of the movable framework and a lower second end coupled to the column and the second actuator has an upper first end connected to a second portion of the movable framework and a lower second end coupled to the column.

8. A surgical table according to claim 7, wherein the second end of each of the first and second actuators is coupled to an external surface of the column.

9. A surgical table according to claim 7 wherein the second end of each of the first and second actuators is pivotally coupled to the column.

10. A surgical table according to claim 2, wherein the first and second actuators each comprise an electrical linear actuator.

11. A surgical table according to claim 2, wherein the first and second actuators each comprise an elongate element having an upper end connected by a pivot joint to the movable framework and a drive assembly coupled to a lower portion of the elongate element for extending, or retracting, the elongate element so as respectively to raise, or lower, the respective first and second portions of the movable framework.

12. A surgical table according to claim 11, wherein the elongate element comprises a leadscrew and the drive assembly is adapted to rotate the leadscrew to extend, or retract, the leadscrew so as respectively to raise, or lower, the respective first and second portions of the movable framework, optionally wherein the leadscrew extends entirely through the drive assembly so that a lower end of the leadscrew is below the drive assembly at least when the leadscrew is retracted.

13. A surgical table according to claim 11, wherein the elongate element is linear and is inclined at an acute angle from the plane including a longitudinal axis of the column and the trend axis so that the upper end is oriented further from the plane than the lower portion.

14. A surgical table according to claim 13, wherein the elongate elements of the first and second actuators are oriented in opposite directions from the plane.

15. A surgical table according to claim 6, wherein the lower second end of each of the first and second actuators is pivotally coupled to the column and the acute angle of inclination of each elongate element from the plane decreases as the extension of the elongate element increases.

16. A surgical table according to claim 1, wherein the movable framework defines an internal opening which is larger than an upper end of the column and the first actuator mechanism is capable of lowering the movable framework relative to the column to a lowermost position in which the movable framework is below the upper end of the column and surrounds the column.

17. A surgical table according to claim 16, wherein in the lowermost position the trend axis is below the upper end of the column.

18. A surgical table according to claim 16, wherein in the lowermost position the movable framework is entirely below the upper end of the column.

19. A surgical table according to claim 1, wherein the first actuator mechanism is capable of raising the movable framework relative to the column to an uppermost position in which the moveable framework is above an upper end of the column.

20. A surgical table according to claim 19, wherein in the uppermost position the trend axis is above the upper end of the column.

* * * * *